US012002641B2

(12) United States Patent
Zhong et al.

(10) Patent No.: US 12,002,641 B2
(45) Date of Patent: Jun. 4, 2024

(54) HIGH-VOLTAGE DC RELAY HAVING A MOVABLE PIECE

(71) Applicant: Xiamen Hongfa Electric Power Controls Co., Ltd., Xiamen (CN)

(72) Inventors: Shuming Zhong, Xiamen (CN); Wenguang Dai, Xiamen (CN); Zhuxiong Wu, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 0 days.

(21) Appl. No.: 17/964,726

(22) Filed: Oct. 12, 2022

(65) Prior Publication Data

US 2023/0029524 A1 Feb. 2, 2023

Related U.S. Application Data

(63) Continuation of application No. 16/879,996, filed on May 21, 2020, now Pat. No. 11,501,939.

(30) Foreign Application Priority Data

May 21, 2019 (CN) ........................ 201910424887.X
May 21, 2019 (CN) ......................... 201910425782.6

(51) Int. Cl.
*H01H 50/58* (2006.01)
*H01H 50/02* (2006.01)
(Continued)

(52) U.S. Cl.
CPC ............ *H01H 50/58* (2013.01); *H01H 50/02* (2013.01); *H01H 50/14* (2013.01);
(Continued)

(58) Field of Classification Search
None
See application file for complete search history.

(56) References Cited

U.S. PATENT DOCUMENTS 3,942,143 A 3/1976 Pollmann et al.
11,501,939 B2 11/2022 Zhong et al.
(Continued)

FOREIGN PATENT DOCUMENTS

CN 206301748 U 7/2017
CN 107204254 A 9/2017
(Continued)

OTHER PUBLICATIONS

Extended European Search Report dated Oct. 28, 2020, in connection with European Application No. EP 20175941.2.
(Continued)

*Primary Examiner* — Bernard Rojas
(74) *Attorney, Agent, or Firm* — Wolf, Greenfield & Sacks, P.C.

(57) ABSTRACT

A high-voltage DC relay of the present disclosure, including a housing, two main lead-out terminals, a main movable piece and a pushing rod component; and the relay further including two auxiliary lead-out terminals, an auxiliary movable spring, and an insulating partition plate, the insulating partition plate is disposed in a vertical plane on a side of the main movable piece, the auxiliary movable spring is on a side of the insulating partition plate opposite the main movable piece, and is disposed along the vertical direction, the insulating partition plate is configured to completely isolate the main movable piece and the auxiliary movable spring; the auxiliary movable spring is insulated from the movable assembly and fixed to the movable assembly through the insulating partition plate, so as to follow a movement of the movable assembly to achieve bridging with the two auxiliary lead-out terminals.

19 Claims, 28 Drawing Sheets

(51) Int. Cl.
*H01H 50/14* (2006.01)
*H01H 50/54* (2006.01)
*H01H 50/64* (2006.01)

(52) U.S. Cl.
CPC ........ *H01H 50/546* (2013.01); *H01H 50/641* (2013.01); *H01H 2235/01* (2013.01)

(56) References Cited

U.S. PATENT DOCUMENTS

| | | | |
|---|---|---|---|
| 2015/0022292 A1 | 1/2015 | Tachikawa et al. |
| 2016/0293368 A1 | 10/2016 | Tanaka et al. |
| 2018/0144893 A1 | 5/2018 | Konishi et al. |
| 2018/0158635 A1 | 6/2018 | Tashima et al. |
| 2018/0197707 A1 | 7/2018 | Takaya et al. |
| 2020/0294747 A1 | 9/2020 | Yao et al. |
| 2020/0373111 A1 | 11/2020 | Zhong et al. |

FOREIGN PATENT DOCUMENTS

| | | | |
|---|---|---|---|
| CN | 107851543 A | 3/2018 |
| CN | 108597955 A | 9/2018 |
| CN | 208655458 U | 3/2019 |
| CN | 209859880 U | 12/2019 |
| CN | 209859881 U | 12/2019 |
| EP | 3 258 476 A1 | 12/2017 |
| EP | 3 432 337 A1 | 1/2019 |
| JP | 2015-37052 A | 2/2015 |
| KR | 101902013 B1 | 11/2018 |
| WO | 2018/056523 A1 | 3/2018 |
| WO | 108831802 A | 11/2018 |

OTHER PUBLICATIONS

Chinese Office Action dated Jan. 18, 2024, in connection with Chinese Application No. 20191042887.X.

Chinese Office Action dated Jan. 16, 2024, in connection with Chinese Application No. 201910425782.6.

HIGH-VOLTAGE DC RELAY HAVING A MOVABLE PIECE

CROSS REFERENCE TO RELATED APPLICATIONS

This application claims the benefit under 35 U.S.C. § 120 and is a continuation of U.S. patent application Ser. No. 16/879,996, filed on May 21, 2020, entitled "HIGH VOLTAGE DC RELAY", which claims priority to Chinese Patent Application No. 201910424887.X, titled "HIGH-VOLTAGE DC RELAY WITH AUXILIARY CONTACTS", filed on May 21, 2019, and to Chinese Patent Application No. 201910425782.6, titled "HIGH-VOLTAGE DC RELAY WITH THE FUNCTION OF MONITORING THE WORKING STATE OF THE MAIN CONTACTS", filed on May 21, 2019, the entire contents thereof are incorporated herein by reference.

TECHNICAL FIELD

The present disclosure relates to the technical field of high-voltage DC relays, in particular, to a high-voltage DC relay with auxiliary contacts and a high-voltage DC relay with a function of monitoring the working state of the main contacts.

BACKGROUND

A high-voltage DC relay (High-voltage direct current relay) of the related art includes a contact portion and a magnetic circuit portion, the magnetic circuit portion adopts a direct-acting magnetic circuit structure, the contact portion is located at the upper part, and the magnetic circuit portion is located at the lower part, the magnetic circuit portion drives the movable piece component of the contact portion through the pushing rod component, the movable piece component is usually adopted a straight-blade movable piece (also called bridge-type movable piece). Through the contact and separation of the straight-blade piece and the two stationary contact terminals (that is, the two load terminals), the load is realized through closing and opening.

In the related art, the high-voltage DC relay usually contains a movable contact and a stationary contact in the cavity of the housing, in order to accelerate the extinction of the arc, the inside of the cavity is usually evacuated and filled with an inert gas to protect the position where the contacts are matched. In order to achieve the function of inflation and exhaust of the sealed cavity portion of the product, an exhaust pipe (using a copper tube) is usually connected to the sealed cavity portion to meet the above function.

The high-voltage DC relay of the related art requires auxiliary contact when required for the application environment, this type of high-voltage DC relay with auxiliary contacts usually uses straight-blade auxiliary spring, and the straight-blade auxiliary spring is installed in the pushing rod component, and the projections of the straight-blade auxiliary spring and the main movable piece on the same horizontal plane intersect vertically, in this case, the two auxiliary stationary contacts will be located at both sides of the line leading from the two main stationary contacts, this structure will increase the volume of the product due to the increase of auxiliary contacts, when the volume of the product is limited, such as the high-voltage DC relay used in the charging pile project, it causes difficulties to add auxiliary contacts.

SUMMARY

According to one aspect of the present disclosure, providing a high-voltage DC relay, including a housing, two main lead-out terminals, a main movable piece and a pushing rod component; the two main lead-out terminals are respectively mounted on a top of the housing and bottom ends of the two main lead-out terminals are respectively located inside the housing, the main movable piece is accommodated in the housing and fitted under the two main lead-out terminals, so that the main movable piece is bridged with the two main lead-out terminals; the main movable piece and the pushing rod component are assembled together to form a movable assembly; wherein the relay further including two auxiliary lead-out terminals, an auxiliary movable spring and an insulating partition plate, the two auxiliary lead-out terminals are respectively installed on the same side of a connecting line of the two main lead-out terminals corresponding to the top of the housing, and bottoms of the two auxiliary lead-out terminals are respectively located in the housing; the auxiliary movable spring is insulated from the movable assembly and fixed to the movable assembly through the insulating partition plate, so as to follow a movement of the movable assembly to achieve bridging with the two auxiliary lead-out terminals; the auxiliary movable spring including a connection portion for fixing with the insulating partition plate, a contact portion for matching with the bottom ends of the two auxiliary lead-out terminals, and a main body portion between the connection portion and the contact portion, the contact portion is disposed along a horizontal direction, the main body portion and the insulating partition plate are both disposed along the vertical direction, and the main body portion is located outside one side of the insulating partition plate and the other side of the insulating partition plate is connected with the movable assembly.

According to an exemplary embodiment of the present disclosure, the auxiliary movable spring is an U-shaped structure, a bottom of the U shape of the U-shaped structure is arranged as the contact portion, both sides of the U shape of the U-shaped structure are arranged as the main body portion, ends of both sides of the U shape of the U-shaped structure are arranged as the connection portion, and the connection portion is at the top, the contact portion is at the bottom.

According to an exemplary embodiment of the present disclosure, the auxiliary movable spring is an U-shaped structure, a bottom of the U shape of the U-shaped structure is arranged as the connection portion, both sides of the U shape of the U-shaped structure are arranged as the main body portion, ends of both sides of the U shape of the U-shaped structure are arranged as the contact portion, and the connection portion is at the top, the contact portion is at the bottom.

According to an exemplary embodiment of the present disclosure, the auxiliary movable spring is a mouth-shaped structure, the auxiliary movable spring is a mouth-shaped structure, an upper side of the mouth shape of the mouth-shaped structure is arranged as the connection portion, two sides of the mouth shape of the mouth-shaped structure are arranged as the main body portion, and a bottom side of the mouth shape of the mouth-shaped structure is arranged as the contact portion.

According to an exemplary embodiment of the present disclosure, the main body portion of the auxiliary movable spring is further provided with a bending portion protruding in a direction away from the insulating partition plate.

According to an exemplary embodiment of the present disclosure, the connection portion of the auxiliary movable spring is embedded in the insulating partition plate by injection molding, so that the connection portion of the auxiliary movable spring is fixed to the insulating partition plate.

According to an exemplary embodiment of the present disclosure, the connection portion of the auxiliary movable spring is bent horizontally or vertically, and embedded in the insulating partition plate.

According to an exemplary embodiment of the present disclosure, the connection portion of the auxiliary movable spring is further provided with a first through hole to allow a plastic body to enter the first through hole during injection, thereby increasing the connection strength between the auxiliary movable spring and the insulating partition plate.

According to an exemplary embodiment of the present disclosure, the connection portion of the auxiliary movable spring is fixed on one side of the insulating partition plate by interference fit or hot riveting, at least one first convex bud is provided on one side of the insulating partition plate, the connection portion of the auxiliary movable spring is configured to extend in the vertical direction, and at least one second through hole is provided in the connection portion, the first convex bud of the insulating partition plate are inserted into the second through hole of the auxiliary movable spring and fixed by an interference method or a hot riveting method.

According to an exemplary embodiment of the present disclosure, the pushing rod component comprises a U-shaped bracket, a first fixing piece and a pushing rod, one end of the pushing rod and the first fixing piece are combined into a pushing rod head by injection molding, and the other end of the pushing rod is configured to serves as a tail and is connected to a magnetic circuit portion, two ends of the U-shaped bracket are connected downward to the first fixing piece protruding from the pushing rod head to both sides thereof, and the main movable piece is installed in the U-shaped bracket through the main spring, one end of the main spring is configured to press the main movable piece against the inside of the top of the U-shaped bracket, and the other end of the main spring is configured to press against the pushing rod head.

According to an exemplary embodiment of the present disclosure, the other side of the insulating partition plate is fixed to the main movable piece by a second fixing piece, the second fixing piece is arranged horizontally, one end of the second fixing piece is fixed to the insulating partition plate, and the other end of the second fixing piece is fixed to a bottom surface of the main movable piece by riveting.

According to an exemplary embodiment of the present disclosure, the main movable piece is provided with a second convex bud projecting downward, the other end of the second fixing piece is provided with a third through hole, the second convex bud of the main movable piece is fitted in the third through hole of the second fixing piece and fixed by riveting.

According to an exemplary embodiment of the present disclosure, the one end of the second fixing piece is embedded in the insulating partition by injection molding, so that the one end of the second fixing piece is fixed to the insulating partition plate.

According to an exemplary embodiment of the present disclosure, the other side of the insulating partition plate is integrally formed with the plastic body portion of the pushing rod head by hot riveting method.

According to an exemplary embodiment of the present disclosure, the other side of the insulating partition plate is fixed to a top of the U-shaped bracket through a third fixing piece, the third fixing piece is arranged horizontally, one end of the third fixing piece is fixed to the insulating partition plate, and the other end of the third fixing piece is fixed to a top surface of the top of the U-shaped bracket by riveting.

According to an exemplary embodiment of the present disclosure, the other end of the third fixing piece is provided with a third convex bud projecting downward, the top of the U-shaped bracket is provided with a fourth through hole, and the third convex bud of the third fixing piece is fitted in the fourth through hole of the U-shaped bracket and fixed by riveting.

According to an exemplary embodiment of the present disclosure, the top of the U-shaped bracket is further provided with a lug boss protruding upward, the fourth through hole of the U-shaped bracket is provided at the lug boss, so that a riveting portion of the third convex bud of the third fixing piece is configured to give way to the main movable piece.

According to an exemplary embodiment of the present disclosure, one end of the third fixing piece is embedded in the insulating partition plate by injection molding, so that one end of the third fixing piece is fixed to the insulating partition plate.

According to another aspect of the present disclosure, providing a high-voltage DC relay, including a housing, two main lead-out terminals, a movable assembly, a yoke plate and a coil; the housing is fitted on the yoke plate and surrounds a cavity for accommodating the main contacts; the two main lead-out terminals are respectively mounted on a top of the housing and a bottom end of each of the two main lead-out terminals set as the main stationary contact are arranged in the cavity; the movable assembly includes a pushing rod component and a main movable piece installed in a pushing rod head of the pushing rod component, the pushing rod head is fitted in the cavity and is configured to make the main movable contacts provided at both ends of the main movable piece be matched with the main stationary contacts of the two main lead-out terminals; the tail portion of the movable assembly is configured to pass through the yoke plate and cooperate with the coil under the yoke plate to push the main movable piece to move when the coil works and further to make the main movable contacts and the main stationary contacts contact with each other; the top of the housing is also installed with an exhaust pipe made of copper material, and the lower portion of the exhaust pipe is located in the cavity; the lower portion of the exhaust pipe is also sleeved with a first electrical conductor that can slide up and down along the exhaust pipe, the first electrical conductor is also connected to the movable assembly and makes the first electrical conductor in contact with the yoke plate when the coil is not in operation; the yoke plate is further provided with a second electrical conductor; the exhaust pipe and the second electrical conductor are respectively connected to signal lines to monitor the working state of the main contacts.

According to an exemplary embodiment of the present disclosure, the first electrical conductor is a contact ring, the movable assembly is provided with an insulating arm extending toward the exhaust pipe in the horizontal direction, the movable assembly is configured to drive the contact ring to move through the insulating arm.

According to an exemplary embodiment of the present disclosure, the contact ring is provided with a step facing downward, the movable assembly is provided with an insulating arm extending toward the exhaust pipe in the horizontal direction, the insulating arm is fitted at the step of the contact ring with a gap from below to upward, so as to drive the contact ring move upward to out of contact with the yoke plate when the movable assembly moves upward.

According to an exemplary embodiment of the present disclosure, a compression spring is further installed between the top end surface of the contact ring and the top inner wall of the housing, when the movable assembly is configured to move downward to move the insulating arm out of contact with the step of the contact ring, the compression spring is further configured to reset and drive\ the contact ring to move downward to re-contact the yoke plate.

According to an exemplary embodiment of the present disclosure, the second electrical conductor is a convex bud integrally formed on the yoke plate.

According to an exemplary embodiment of the present disclosure, the convex bud of the yoke plate is outside the coverage area of the housing, a first signal line is sleeved on the second electrical conductor of the yoke plate through a first wiring terminal, a second signal line is in sleeve contact with the exhaust pipe on the top surface of the housing through a second wiring terminal.

According to an exemplary embodiment of the present disclosure, a projection of the exhaust pipe on the yoke plate and a projection of the convex bud of the yoke plate on the yoke plate are on the same side with respect to a connecting line between the two main lead-out terminals.

According to an exemplary embodiment of the present disclosure, the pushing rod component includes an U-shaped bracket, a first fixing piece and a pushing rod, one end of the pushing rod is connected to the first fixing piece through a plastic body by injection molding, the other end of the pushing rod is connected to the movable iron core and serves as the tail of the pushing rod component to cooperate with the coil, two ends of the U-shaped bracket are connected downward to the first fixing piece protruding from both sides of the plastic body, the main movable piece is installed in the U-shaped bracket through the main spring to form the pushing rod head, one end of the main spring is configured to press the main movable piece toward the inside of the top of the U-shaped bracket, and the other end of the main spring abuts against the plastic body; the insulating arm is formed by the plastic body extending toward the exhaust pipe.

The disclosure will be further described in detail below in conjunction with the drawings and embodiments; however, the high-voltage DC relay of the present disclosure is not limited to the embodiments.

DETAILED DESCRIPTION

The First Implementation

The First Embodiment

Figure 1:
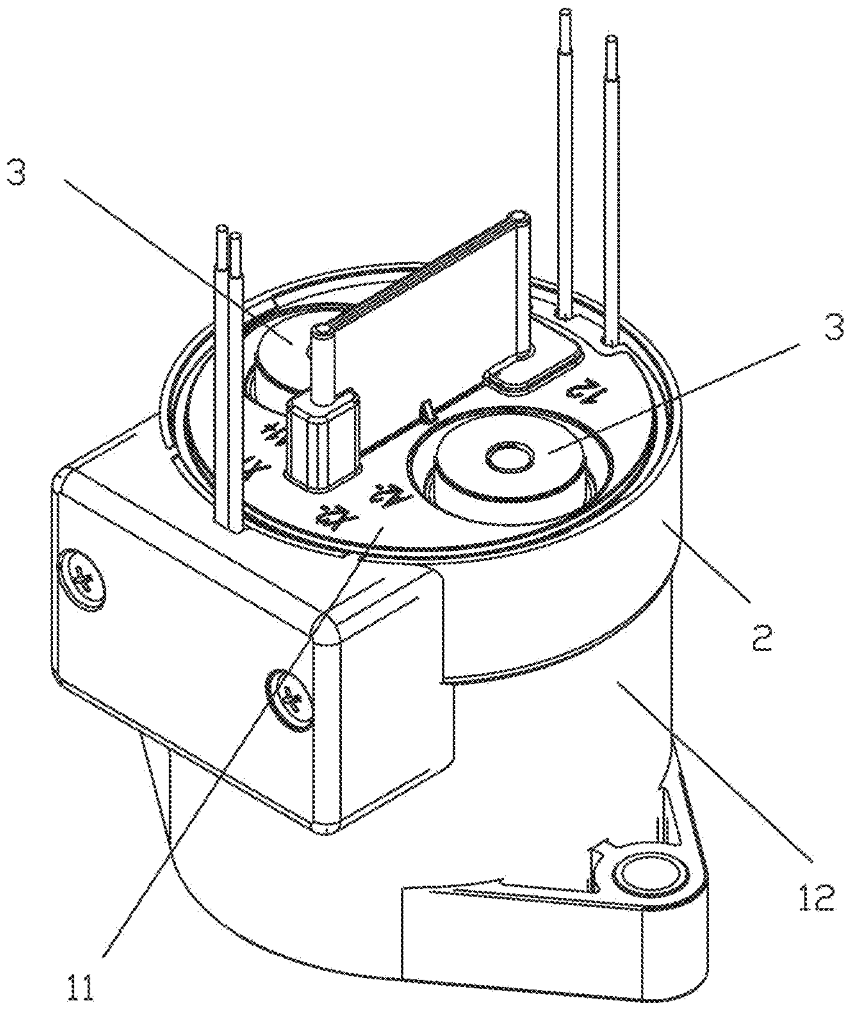
FIG. 1 is a perspective schematic view showing a high-voltage DC relay of the first embodiment of the first implementation of the present disclosure.
Figure 2:
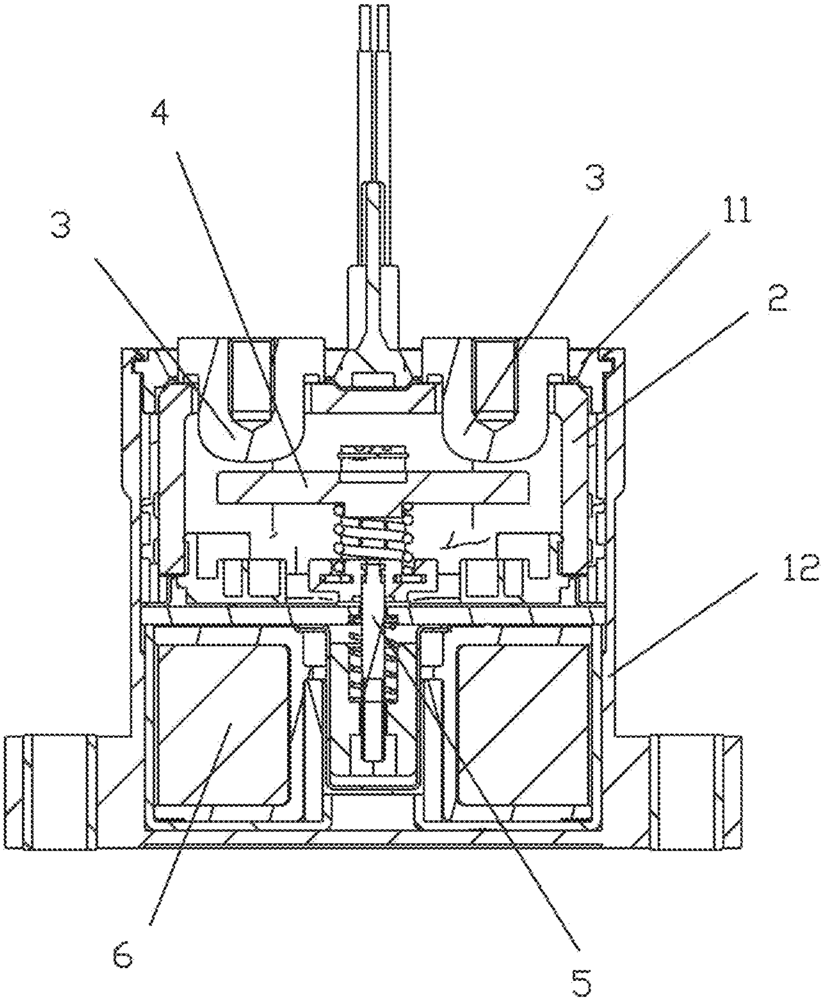
FIG. 2 is a cross-sectional view of the structure showing the high-voltage DC relay of the first embodiment of the first implementation of the present disclosure (sectional view along the connecting line of the two main lead-out terminals).
Figure 3:
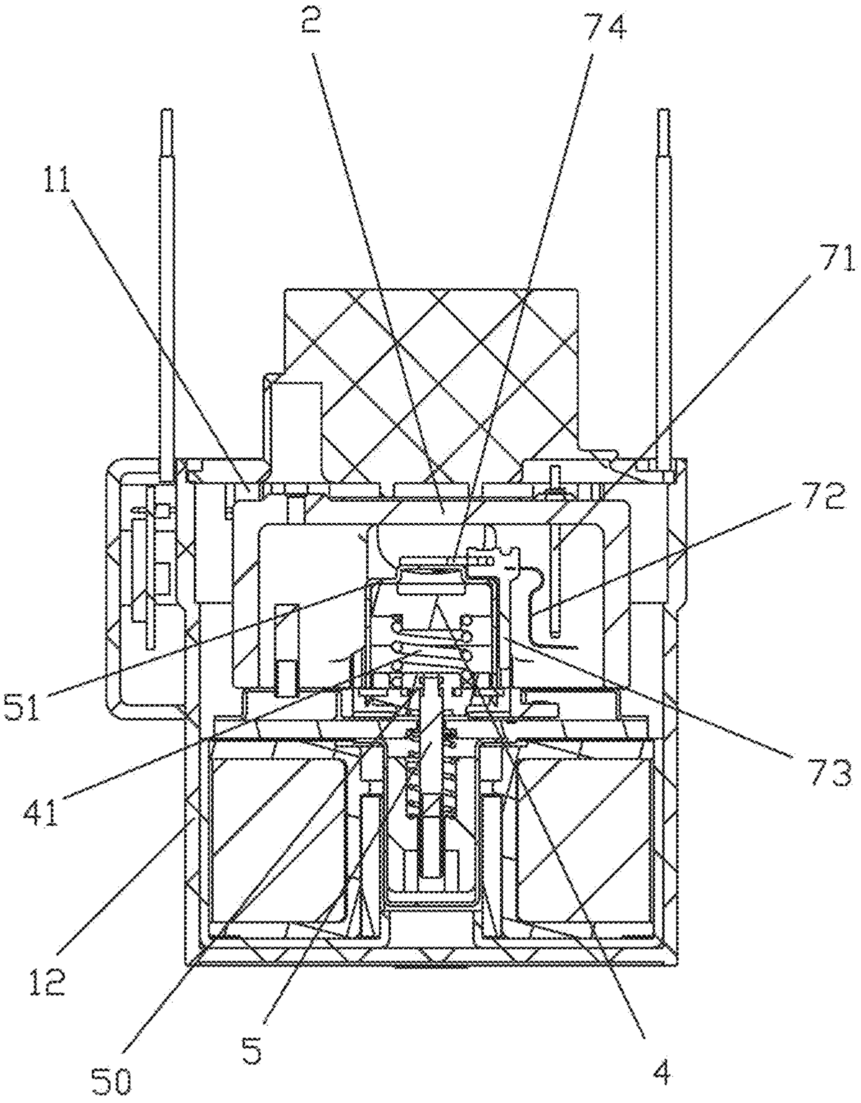
FIG. 3 is a cross-sectional view showing the structure of the high-voltage DC relay of the first embodiment of the first implementation of the present disclosure (sectional view along the line perpendicular to the connecting line and through the middle of the connecting line of the two main lead-out terminals).
Figure 4:
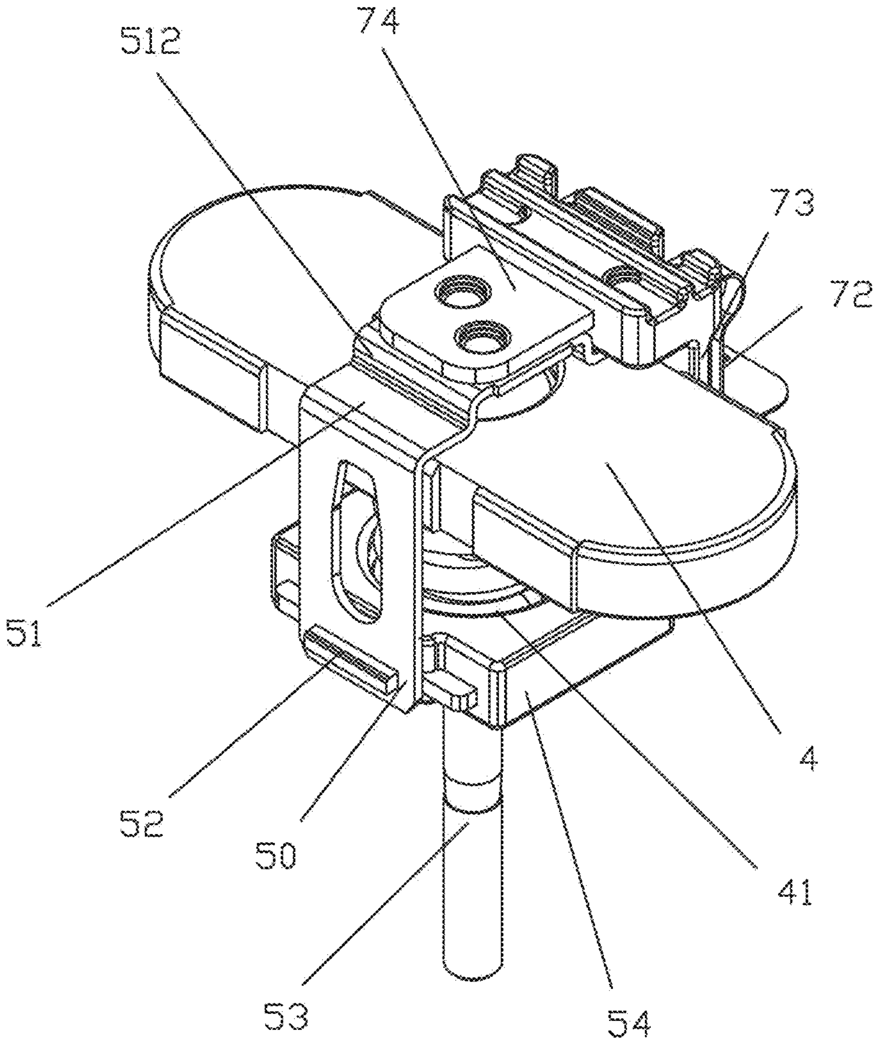
FIG. 4 is a perspective schematic view showing the cooperation of the auxiliary movable spring, the insulating partition plate and the movable assembly of the first embodiment of the first implementation of the present disclosure.
Figure 5:
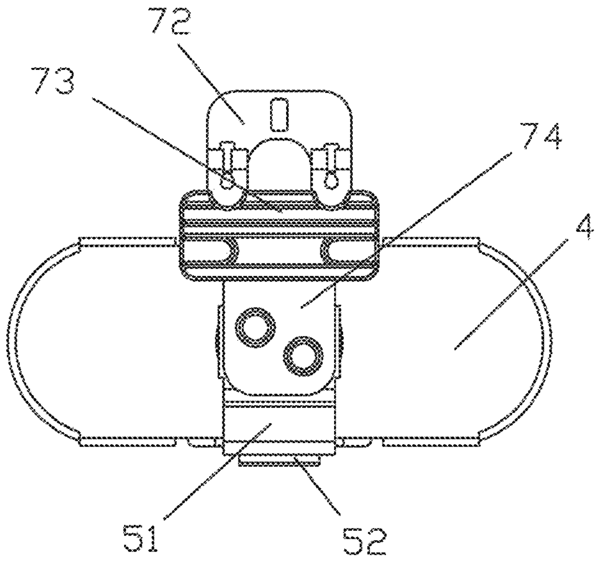
FIG. 5 is a top view showing the cooperation of the auxiliary movable spring, the insulating partition plate and the movable assembly of the first embodiment of the first implementation of the present disclosure.
Figure 6:
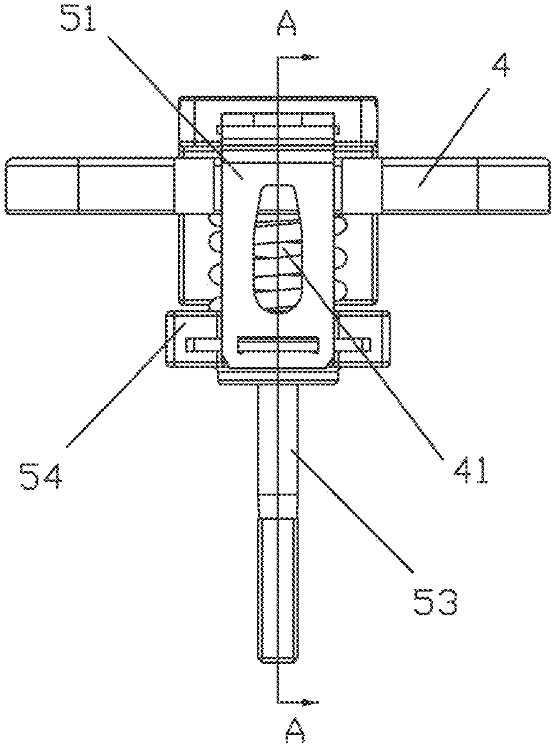
FIG. 6 is a front view showing the cooperation of the auxiliary movable spring, the insulating partition plate and the movable assembly of the first embodiment of the first implementation of the present disclosure.
Figure 7:
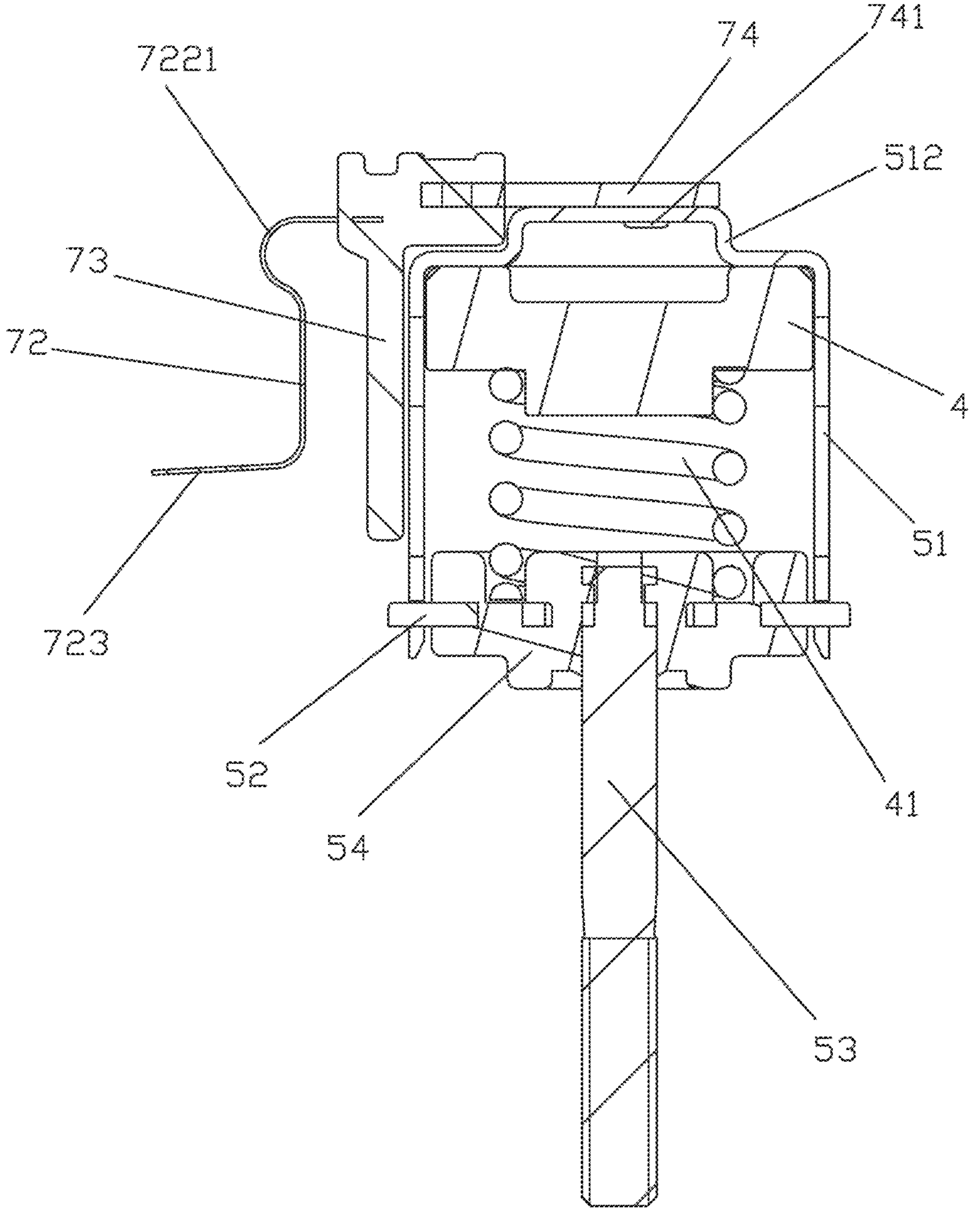
FIG. 7 is a cross-sectional view taken along line A-A in FIG. 6.
Figure 8:
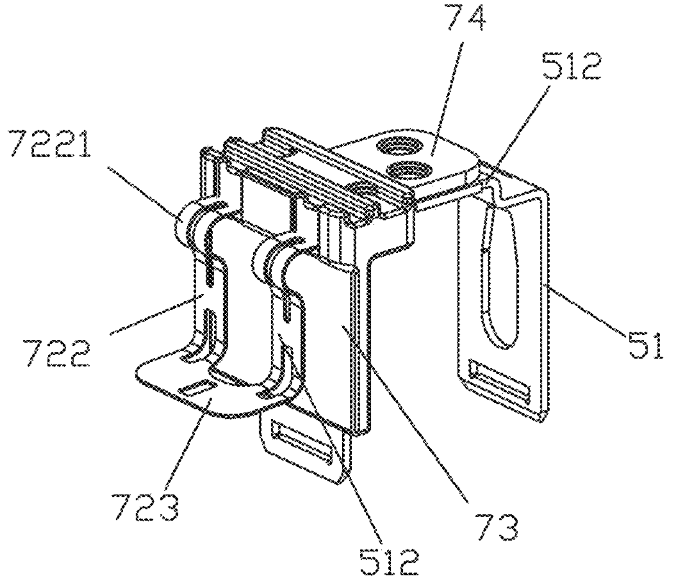
FIG. 8 is a perspective schematic view showing the cooperation of the auxiliary movable spring, the insulating partition plate and the U-shaped bracket of the first embodiment of the first implementation of the present disclosure.
Figure 9:
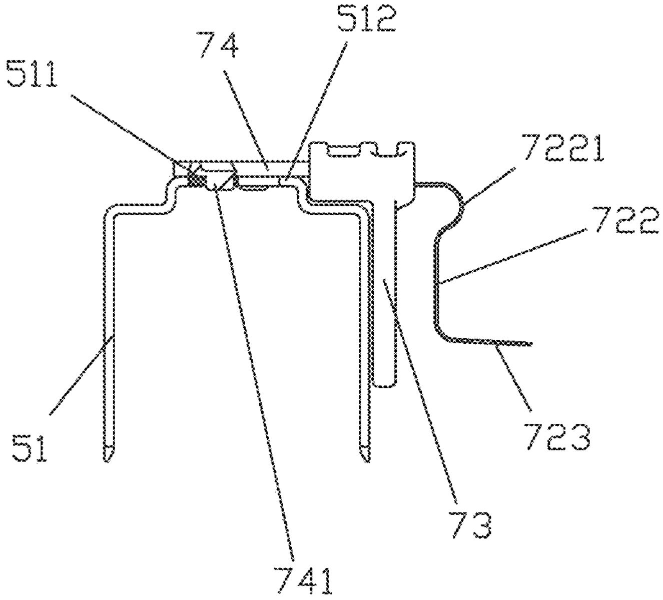
FIG. 9 is a side view showing the cooperation of the auxiliary movable spring, the insulating partition plate and the U-shaped bracket of the first embodiment of the first implementation of the present disclosure.
Figure 10:
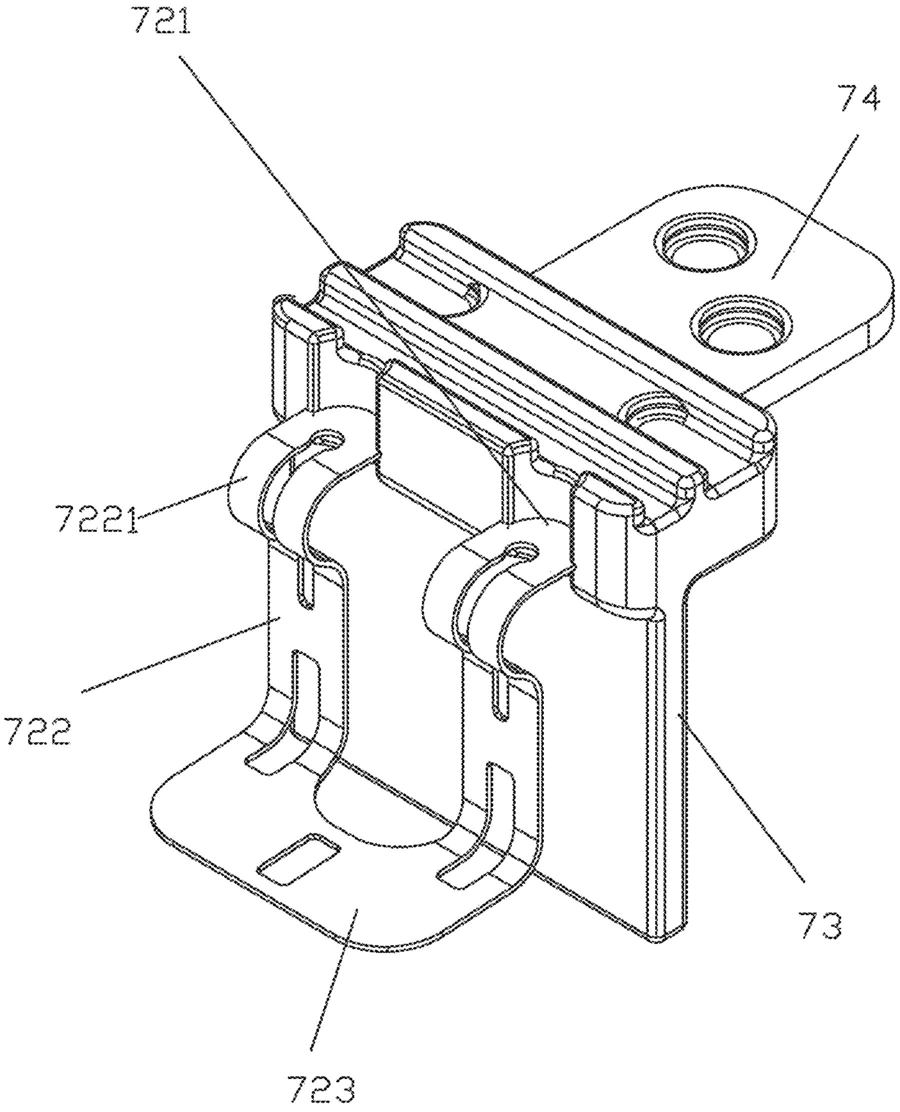
FIG. 10 is a perspective schematic view showing the cooperation of the auxiliary movable spring, the insulating partition plate and the third fixing piece of the first embodiment of the first implementation of the present disclosure.

As shown in FIGS. 1 to 12, a high-voltage DC relay (that is, a high-voltage direct current relay) of the present disclosure, specifically, may be a high-voltage DC relay with auxiliary contacts, including a cover 11, a base 12, a housing 2, two main lead-out terminals 3, a main movable piece 4, a pushing rod component 5 and a magnetic circuit portion 6. Among them, the housing 2 is a ceramic housing; the two main lead-out terminals 3 are respectively mounted on the top of the housing 2 and their respective bottom ends are inside the housing 2; the main movable piece 4 is accommodated in the housing 2 and fits under the two main lead-out terminals 3, so that the main movable piece 4 bridges with the two main lead-out terminals 3; when the main movable piece 4 is pushed by the pushing rod component 5 and then contacts the two main lead-out terminals 3, the current flows in from one main lead-out terminal 3, and flows out from the other main lead-out terminal 3 after passing through the main movable piece 4; the main movable piece 4 and the pushing rod component 5 are assembled together to form a movable assembly 50; the main movable piece 4 is mounted on the upper portion of the pushing rod component 5, and the lower portion of the pushing rod component 5 is connected to the magnetic circuit portion 6. As shown in FIG. 3, the relay further includes two auxiliary lead-out terminals 71, an auxiliary movable spring 72, and an insulating partition plate 73, the two auxiliary lead-out terminals 71 are respectively installed on the same side of the connecting line of the two main lead-out terminals 3 corresponding to the top of the housing 2, and the bottoms of the two auxiliary lead-out terminals 7 are respectively placed in the housing 2; as shown in FIG. 3 and FIG. 7, the insulating partition plate 73 is disposed in a vertical plane and located on a side of the main movable piece 4, the auxiliary movable spring 72 is located on a side of the insulating partition plate 73 opposite the main movable piece 4, and the main body portion 722 of the auxiliary movable spring 72 is disposed in a vertical plane, the insulating partition plate 73 is configured to completely isolate the main movable piece 4 and the auxiliary movable spring 72. As shown in FIG. 4, the insulating partition plate 73 is alongside the side surface of the main movable piece 4, where the side surface extends between the top and bottom surfaces of the main movable piece 4; as shown in FIGS. 2 and 3, the insulating partition plate 73 is located on one side of the main movable piece 4 at a lateral distance from a plane extending across the two main lead-out terminals 3. The auxiliary movable spring 72 is insulated from and fixed to the movable assembly 50 through the insulating partition plate 73, so as to follow the movement of the movable assembly 50 to achieve bridging with the two auxiliary lead-out terminals 71; when the main movable piece 4 is in contact with the two main lead-out terminals 3, the auxiliary movable spring 72 is also in contact with the two auxiliary lead-out terminals 71, by performing signal collection on the auxiliary lead-out terminals 71, the monitoring of the action state of the main contacts can be realized. As shown in FIG. 10, the auxiliary movable spring 72 includes a connection portion 721 for fixing with the insulating partition plate 73, a contact portion 723 for matching with the bottom ends of the two auxiliary lead-out terminals 71, and a main body portion 722 between the connection portion 721 and the contact portion 723, the contact portion 723 is provided along the horizontal direction, the main body portion 722 and the insulating partition plate 73 are both disposed along the vertical direction, and the main body portion 722 is located outside one side of the insulating partition plate 73 and the other side of the insulating partition plate 73 is connected with the movable assembly 50.

Figure 12:
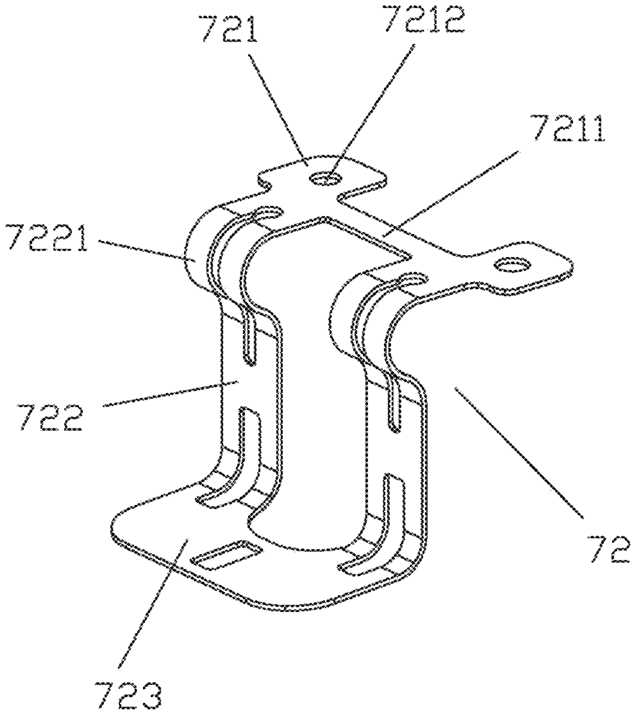
FIG. 12 is a perspective schematic view showing the auxiliary movable spring of the first embodiment of the first implementation of the present disclosure.

In this embodiment, as shown in FIG. 12, the auxiliary movable spring 72 is an U-shaped structure, the bottom of the U shape of the U-shaped structure is arranged as the contact portion 723, both sides of the U shape of the U-shaped structure are arranged as the main body portion 722, the ends of both sides of the U shape of the U-shaped structure are arranged as the connection portion 721, and the connection portion 721 is at the top, the contact portion 723 is at the bottom.

In this embodiment, the auxiliary movable spring is an U-shaped structure, the U-shaped structure may also be: the bottom of the U shape of the U-shaped structure is arranged as the connection portion 721, both sides of the U shape of the U-shaped structure are arranged as the main body portion 722, the ends of both sides of the U shape of the U-shaped structure are arranged as the contact portions 723, and the connection portion 721 is at the top, the contact portion 723 is at the bottom. The embodiments of the present disclosure do not limit the specific correspondence of the U-shaped structure of the auxiliary movable spring. The U-shaped structure is used only to enable those skilled in the art to more easily understand the technical solution of the present application, and no special limitation is made here.

In this embodiment, as shown in FIG. 12, the connection portion 721 may be extended in the horizontal direction by bending the vertical main body portion 722.

In this embodiment, as shown in FIG. 12, a reinforcing piece 7211 is also connected between the ends of both sides of the U shape of the U-shaped structure.

In this embodiment, as shown in FIGS. 10 and 12, the main body portion 722 of the auxiliary movable spring 72 is further provided with a bending portion 7221 that protrudes in a direction away from the insulating partition plate 73.

In this embodiment, the connection portion 721 of the auxiliary movable spring 72 is embedded in the insulating partition plate 73 by injection molding, so that the connection portion 721 of the auxiliary movable spring 72 is fixed to the insulating partition plate 73.

Figure 11:
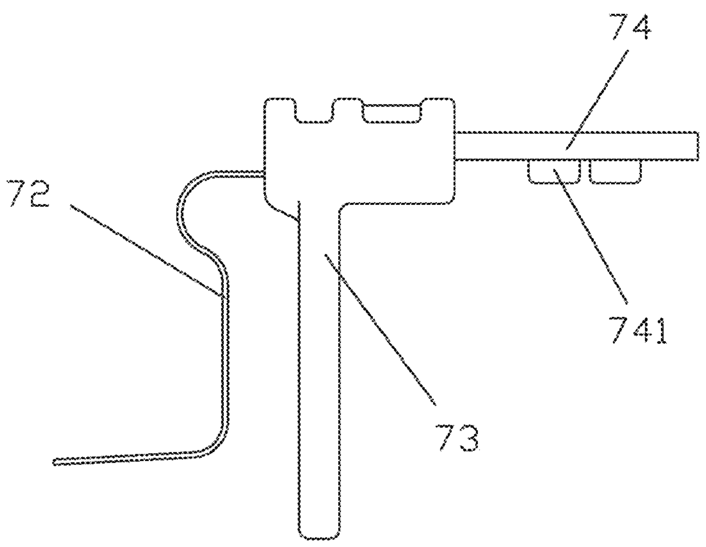
FIG. 11 is a side view showing the cooperation of the auxiliary movable spring, the insulating partition plate and the third fixing piece of the first embodiment of the first implementation of the present disclosure.

In this embodiment, as shown in FIG. 11, the connection portion 721 of the auxiliary movable spring 72 is bent horizontally and embedded in the insulating partition plate 73; alternatively, the connection portion 721 is bent vertically and embedded in the insulating partition plate 73.

In this embodiment, as shown in FIG. 12, the connection portion 721 of the auxiliary movable spring 72 is further provided with a first through hole 7212 to allow the plastic body to enter the first through hole 7212 during injection, thereby increasing the connection strength between the auxiliary movable spring 72 and the insulating partition plate 73.

In this embodiment, as shown in FIG. 7, the pushing rod component 5 includes a U-shaped bracket 51, a first fixing piece 52 and a pushing rod 53, one end of the pushing rod 53 and the first fixing piece 52 are combined into the pushing rod head 54 by injection molding, and the other end of the pushing rod 53 serves as a tail and is connected to the magnetic circuit portion 6, the two ends of the U-shaped bracket 51 are connected downward to the first fixing pieces 52 protruding from the pushing rod head 54 to both sides of the pushing rod 54, and the main movable piece 4 is installed in the U-shaped bracket 51 through the main spring 41, one end of the main spring 41 presses the main movable piece 4 against the inside of the top of the U-shaped bracket 51, and the other end of the main spring 41 presses against the pushing rod head 54.

In this embodiment, as shown in FIG. 7, the other side of the insulating partition plate 73 is fixed to the top of the U-shaped bracket 51 through a third fixing piece 74, the third fixing piece 74 is arranged horizontally, one end of the third fixing piece 74 is fixed to the insulating partition plate 73, and the other end of the third fixing piece 74 is fixed to the top surface of the top of the U-shaped bracket 51 by riveting.

In this embodiment, as shown in FIGS. 9 and 11, the other end of the third fixing piece 74 is provided with a third convex bud 741 projecting downward, the top of the U-shaped bracket 51 is provided with a fourth through hole 511, and the third convex bud 741 of the third fixing piece 74 is fitted in the fourth through hole 511 of the U-shaped bracket 51 and fixed by riveting.

In this embodiment, as shown in FIG. 9, the top of the U-shaped bracket 51 is further provided with a lug boss 512 protruding upward, the fourth through hole 511 of the U-shaped bracket is provided at the lug boss 512, so that the riveting portion of the third convex bud 741 of the third fixing piece 74 gives way to the main movable piece 4.

In this embodiment, one end of the third fixing piece 74 is embedded in the insulating partition plate 73 by injection molding, so that one end of the third fixing piece 74 is fixed to the insulating partition plate 73.

The high-voltage DC relay with auxiliary contacts of the present disclosure adopts that two auxiliary lead-out terminals 71 are respectively installed on the same side of the connecting line of the two main lead-out terminals 71 corresponding to the top of the housing 2, and the bottoms of the two auxiliary lead-out terminals 71 are respectively placed in the housing 2; and the auxiliary movable spring 72 is insulated from the movable assembly 50 through the insulating partition plate 73, so as to follow the movement of the movable assembly 50 to achieve bridging with the two auxiliary lead-out terminals 71; the auxiliary movable spring 72 includes a connection portion 721 for fixing with the insulating partition plate 73, a contact portion 723 for matching with the bottom ends of the two auxiliary lead-out terminals 71, and a main body portion 722 between the connection portion 721 and the contact portion 723, the contact portion 723 is provided along the horizontal direction, the main body portion 722 and the insulating partition plate 73 are both disposed along the vertical direction, and the main body portion 722 is located outside one side of the insulating partition plate 73 and the other side of the insulating partition plate 73 is connected with the movable assembly 50. This structure of the present disclosure is not only possible to add auxiliary contacts in the high-voltage DC relay to monitor the operating state of the main contacts, but also will not increase the volume of the high-voltage DC relay product excessively, so that the product can be used in applications with small space.

The high-voltage DC relay with auxiliary contacts of the present disclosure adopts the design of the auxiliary movable spring 72 is designed as a U-shaped structure, it has the characteristics of simple structure and that it is convenient to arrange the main body portion 722 of the auxiliary movable spring 72 along the vertical direction to reduce the occupation of the product volume and space by the auxiliary movable spring 72, at the same time, it is also convenient to connect with the insulating partition plate 73.

The high-voltage DC relay with auxiliary contacts of the present disclosure adopts that the main body portion 722 of the auxiliary movable spring 72 is further provided with a bending portion 7221 protruding in a direction away from one side of the insulating partition plate 73, so that the rigidity of the auxiliary movable spring 72 can be increased and the stability of contact portion 723 bent into horizontal and the bottom end of the auxiliary lead-out terminals 71 can be improved.

The high-voltage DC relay with auxiliary contacts of the present disclosure adopts that the other side of the insulating partition plate 73 is fixed by riveting the top of the U-shaped bracket 51 by the third fixing piece 74, so that the auxiliary movable spring 72 can move follow the action of the assembly 50, and has a firm connection and effective insulation of strong current and weak current.

The Second Embodiment

Referring to FIGS. 13 to 17, a high-voltage DC relay with auxiliary contacts of the present disclosure, which differs from the first embodiment in that the auxiliary movable spring 72 may be a mouth-shaped structure, specifically, the shape of the projection of the mouth-shaped structure on the insulating partition plate 73 may be a mouth, in one embodiment, the shape of the projection of the mouth-shaped structure on the insulating partition plate 73 may be rectangular, square, or other closed shapes, that is, the auxiliary movable spring 72 may be a closed frame structure. The upper side of the mouth shape of the mouth-shaped structure is arranged as the connection portion 721, the two sides of the mouth shape of the mouth-shaped structure are arranged as the main body portion 722, and the bottom side of the mouth shape of the mouth-shaped structure is arranged as the contact portion 723.

Figure 13:
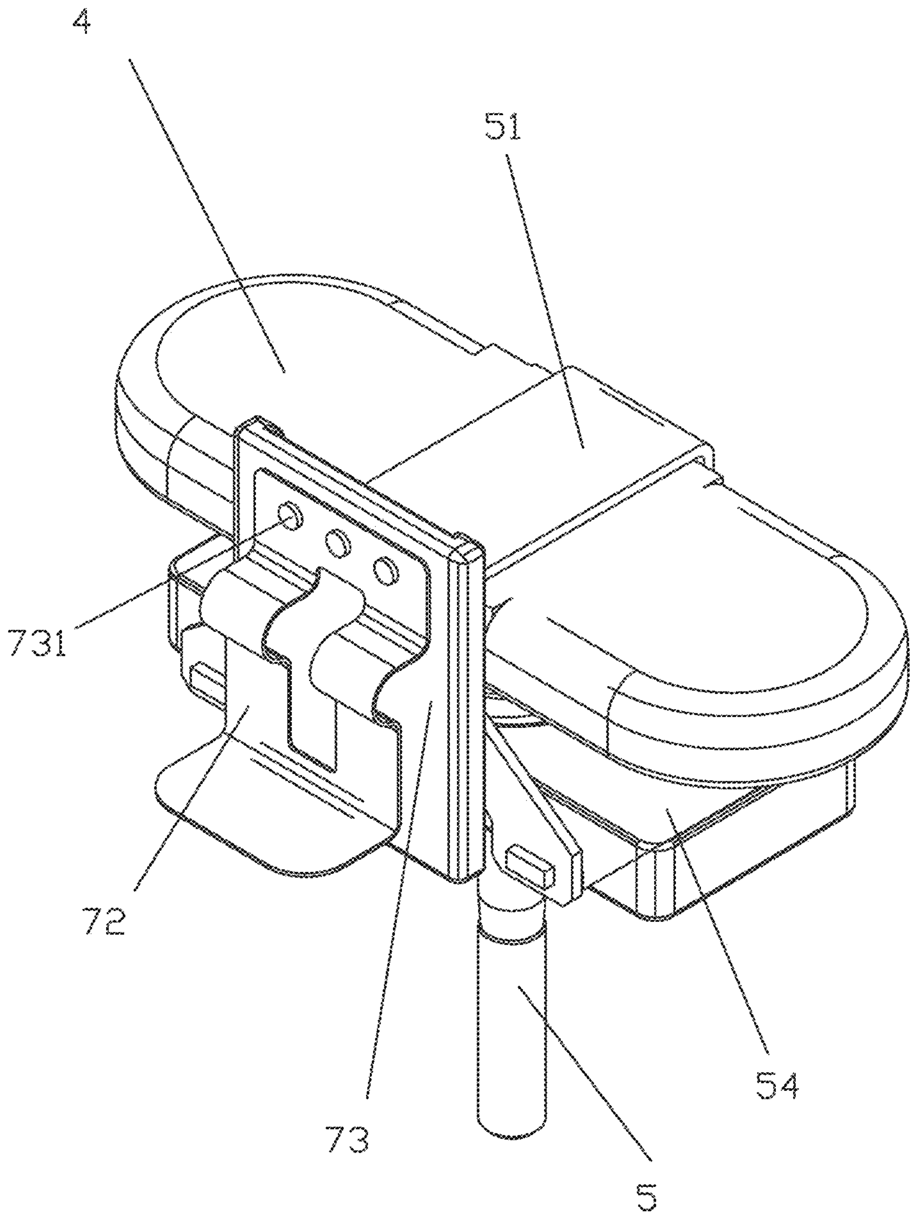
FIG. 13 is a perspective schematic view showing the cooperation of the auxiliary movable spring, the insulating partition plate and the movable assembly of the second embodiment of the first implementation of the present disclosure.
Figure 14:
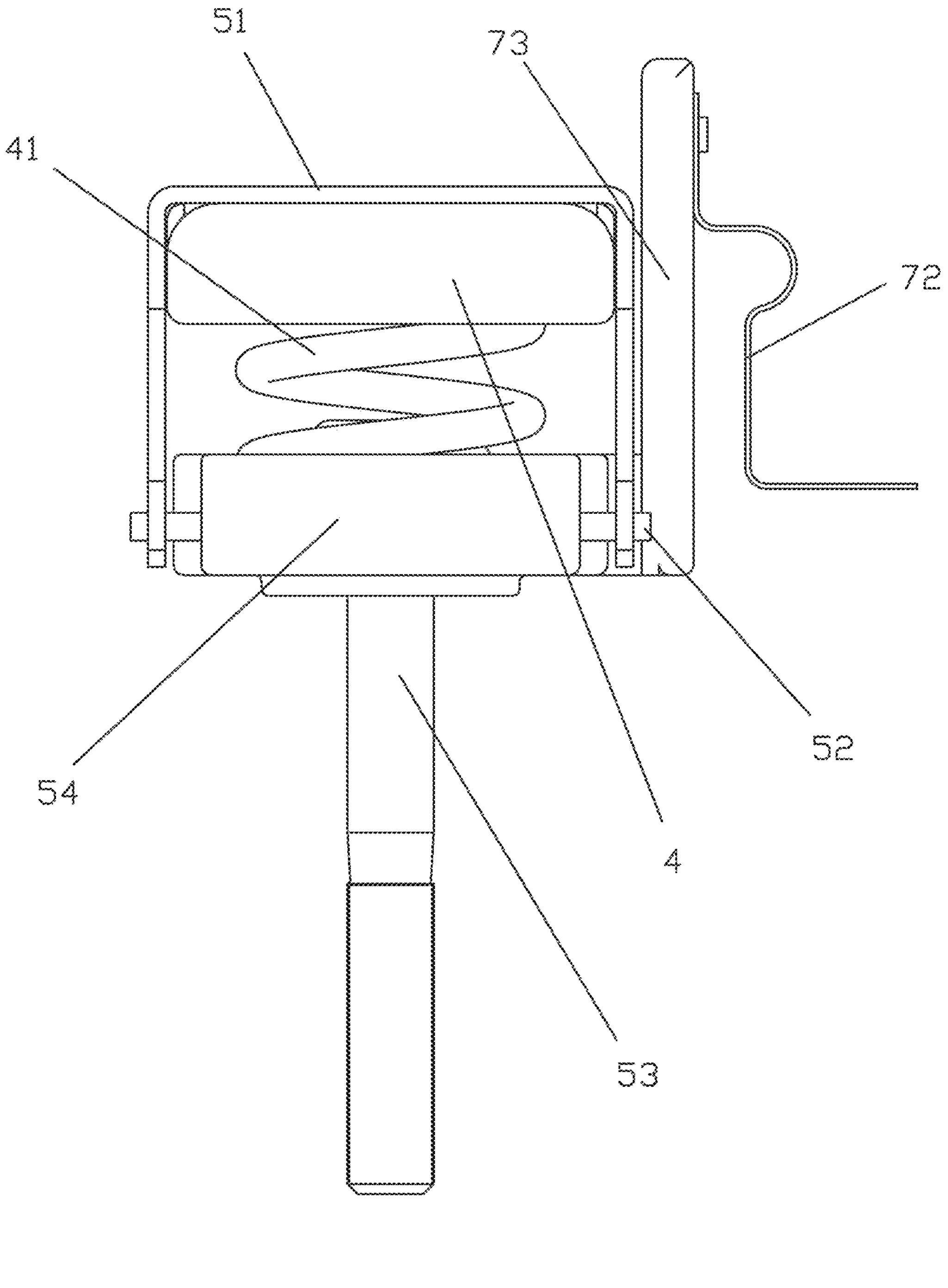
FIG. 14 is a side view showing the cooperation of the auxiliary movable spring, the insulating partition plate and the movable assembly of the second embodiment of the first implementation of the present disclosure.
Figure 15:
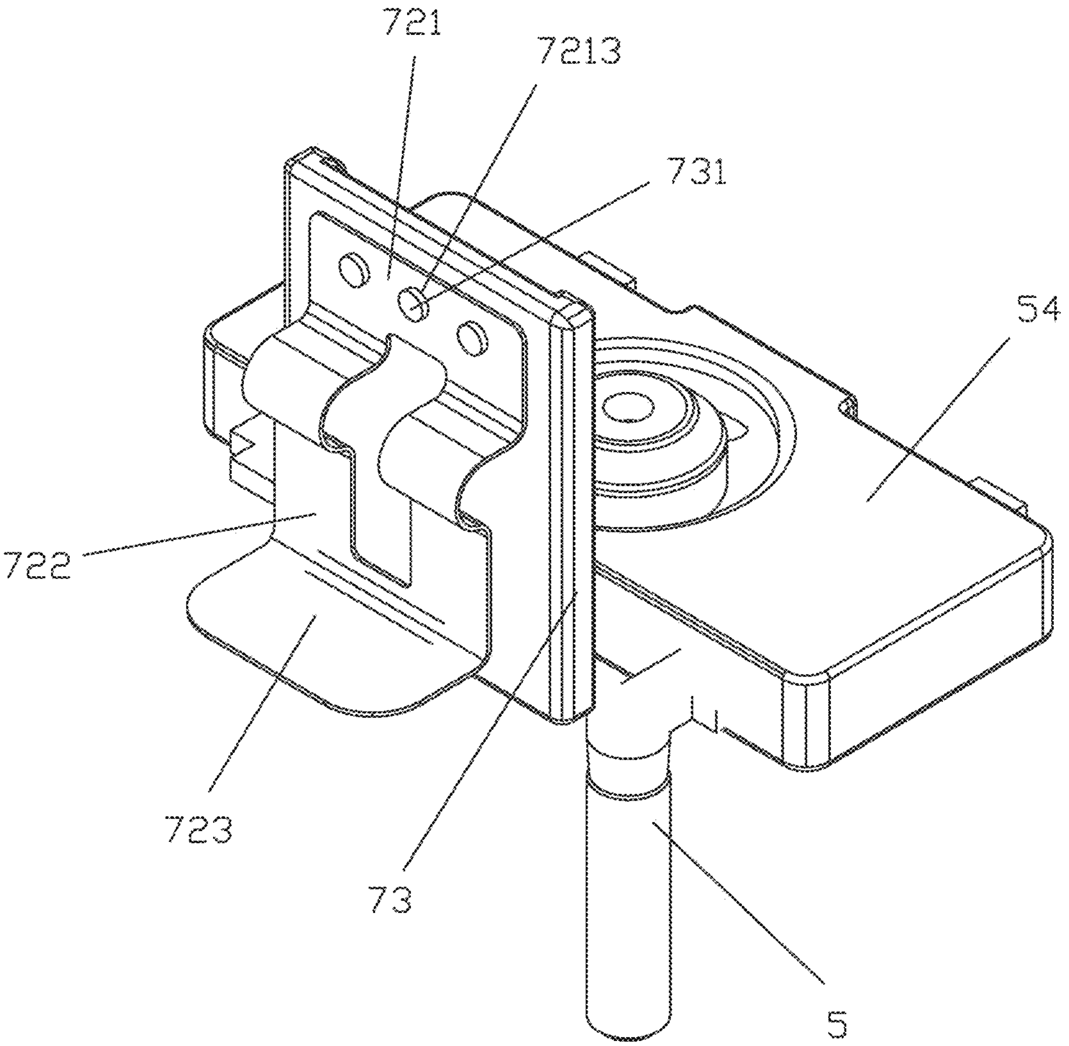
FIG. 15 is a perspective schematic view showing the cooperation of the auxiliary movable spring, the insulating partition plate and the pushing rod head of the second embodiment of the first implementation of the present disclosure.
Figure 16:
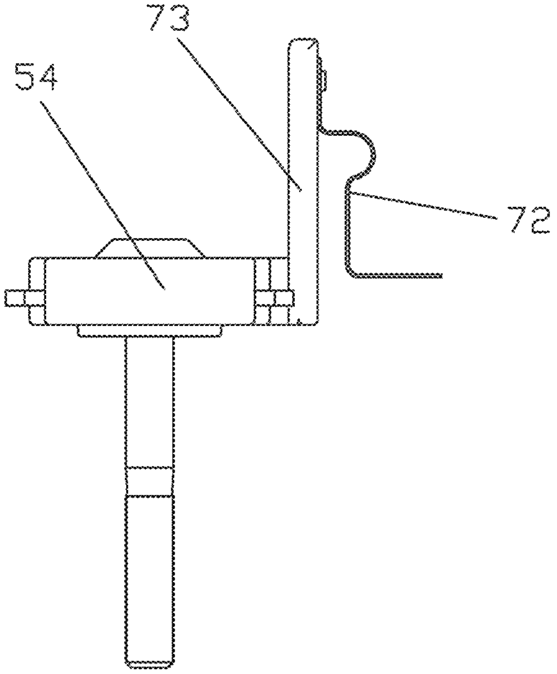
FIG. 16 is a side view showing the cooperation of the auxiliary movable spring, the insulating partition plate and the pushing rod head of the second embodiment of the first implementation of the present disclosure.
Figure 17:
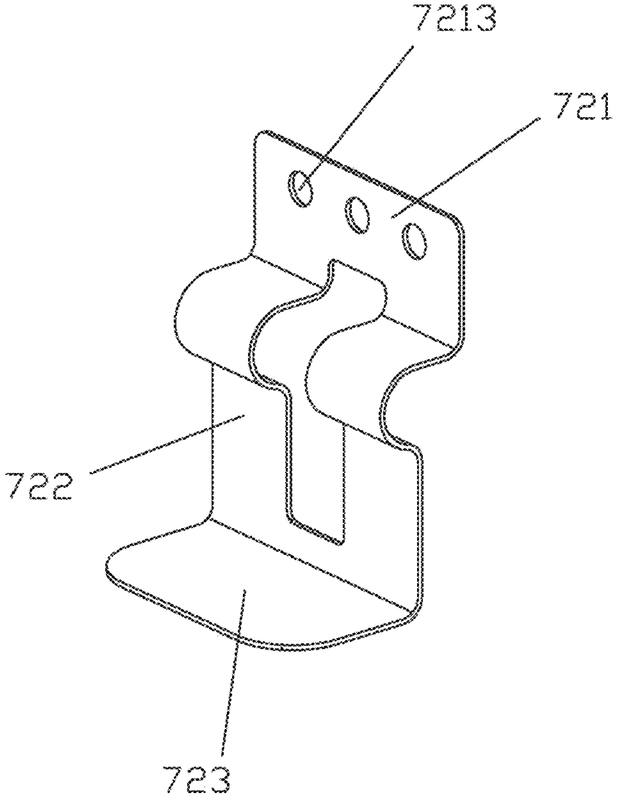
FIG. 17 is a perspective schematic view showing the auxiliary movable spring of the second embodiment of the first implementation of the present disclosure.

In this embodiment, the connection portion 721 of the auxiliary movable spring is fixed on one side of the insulating partition plate 73 by interference fit or hot riveting. As shown in FIGS. 13, 15 and 17, at least one first convex bud 731 is provided on one side of the insulating partition plate 73, and there are may be one, two, three, four or more first convex buds 731, the drawings show three first convex buds 731. The connection portion 721 of the auxiliary movable spring 72 is configured to extend in the vertical direction, and at least one second through hole 7213 is provided in the connection portion 721, the first convex buds 731 of the insulating partition plate 73 are inserted into the second through holes 7213 of the auxiliary movable spring 72 and fixed by an interference method or a hot riveting method.

In this embodiment, as shown in FIGS. 13 to 16, the other side of the insulating partition plate 73 is integrally formed with the plastic body portion of the pushing rod head 54 by integral injection molding.

The high-voltage DC relay with auxiliary contacts of the present disclosure adopts the design of the auxiliary movable spring 72 is designed as a mouth-shaped structure, it has the characteristics of simple structure and that it is convenient to arrange the main body portion 722 of the auxiliary movable spring 72 along the vertical direction to reduce the occupation of the product volume and space by the auxiliary movable spring 72, at the same time, it is also convenient to connect with the insulating partition plate 73.

The high-voltage DC relay with auxiliary contacts of the present disclosure adopts that the other side of the insulating partition plate 73 is integrated with the plastic body portion of the pushing rod head 54 by integral injection molding, so that the auxiliary movable spring 72 can move with the action of the movable assembly 50, and has the effects of firm connection and effective insulation of strong current and weak current.

The Third Embodiment

Figure 21:
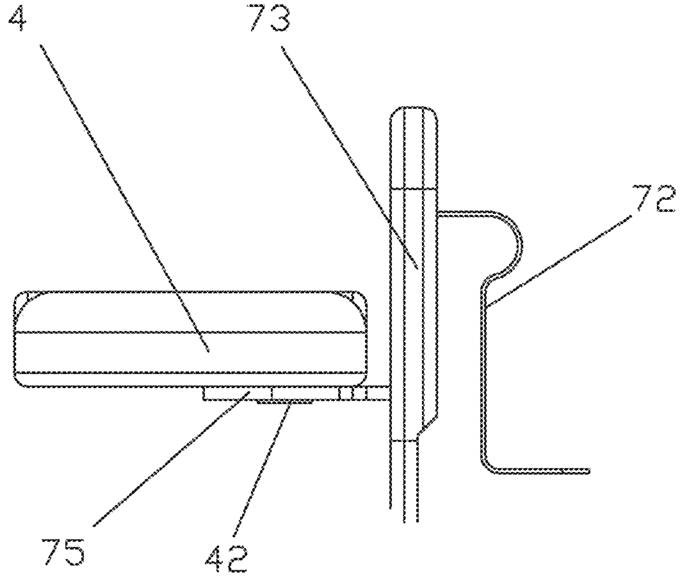
FIG. 21 is a side view showing the cooperation of the auxiliary movable spring, the insulating partition plate and the main movable piece of the third embodiment of the first implementation of the present disclosure.
Figure 22:
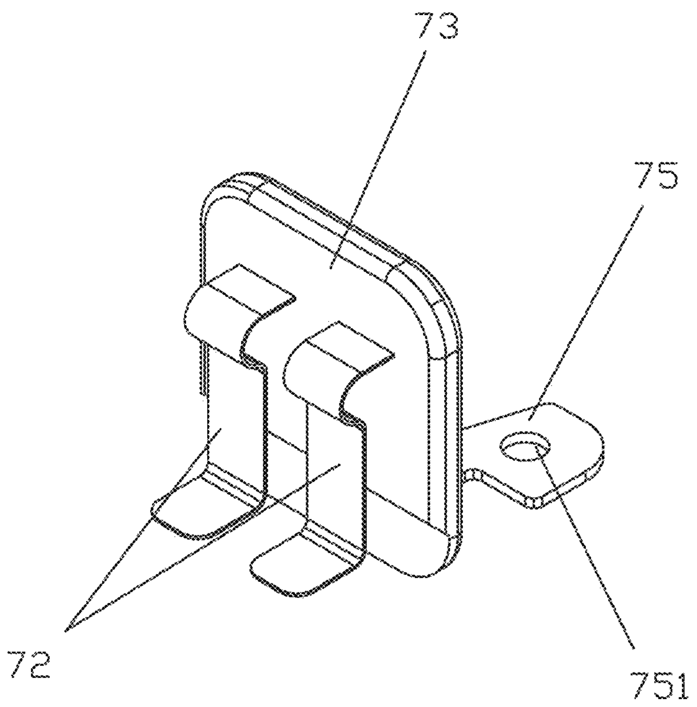
FIG. 22 is a perspective schematic view showing the cooperation of the auxiliary movable spring, the insulating partition plate and the second fixing piece of the third embodiment of the first implementation of the present disclosure.
Figure 23:
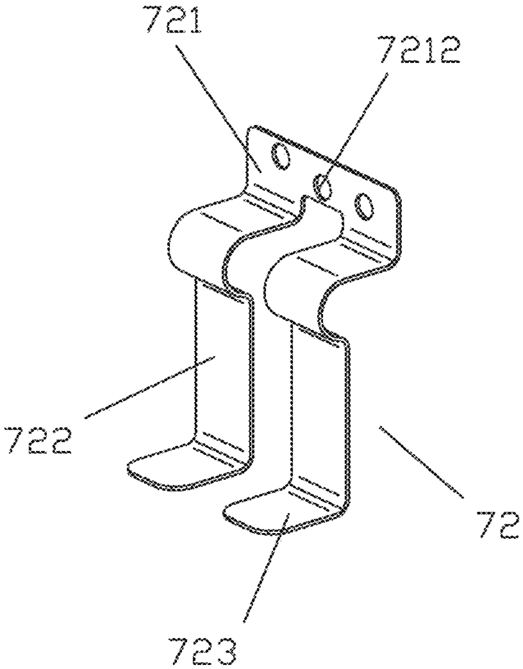
FIG. 23 is a perspective schematic view showing the auxiliary movable spring of the third embodiment of the first implementation of the present disclosure.
Figure 24:
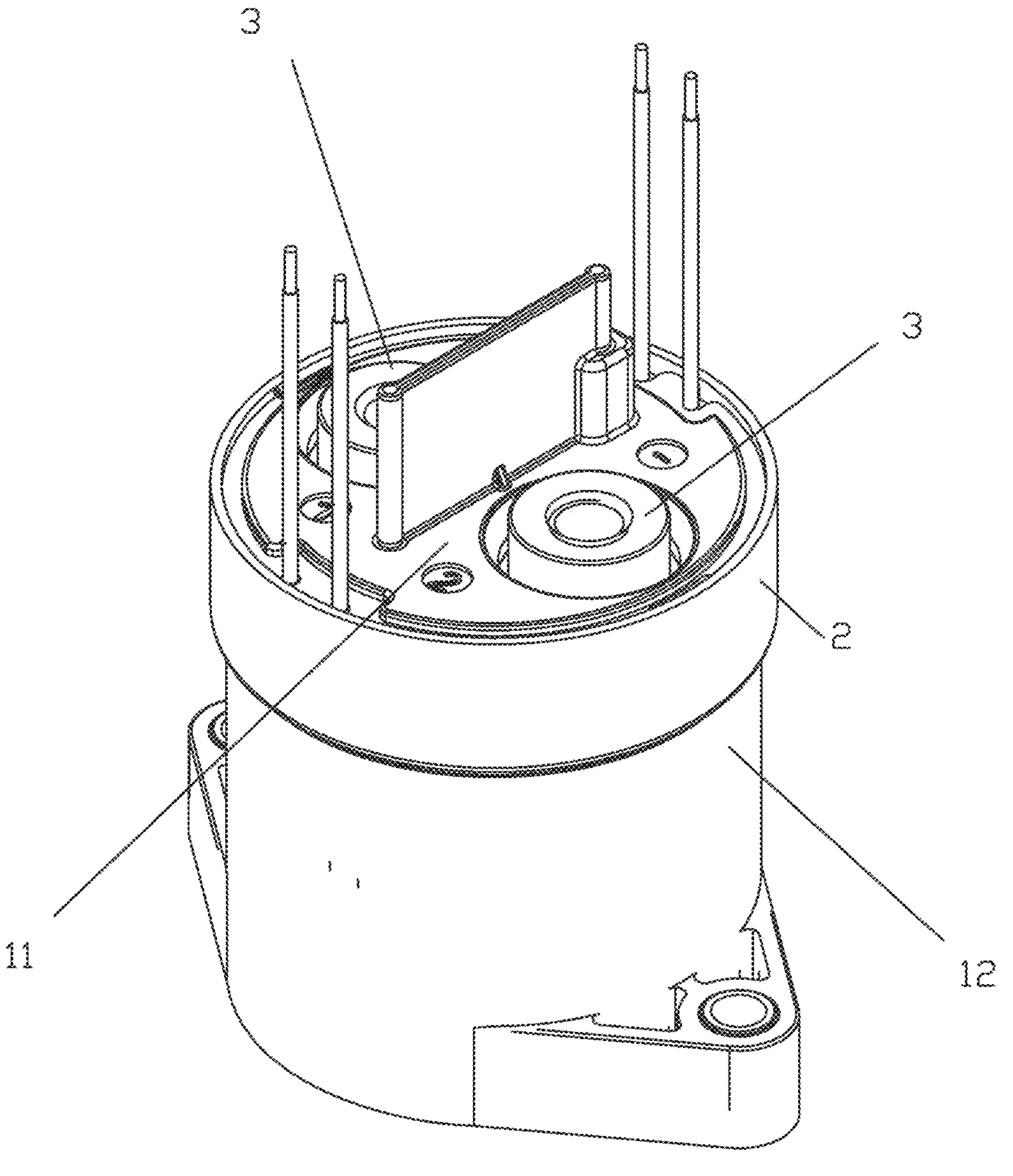
FIG. 24 is a perspective schematic view showing a high-voltage DC relay of the second implementation of the present disclosure.
Figure 25:
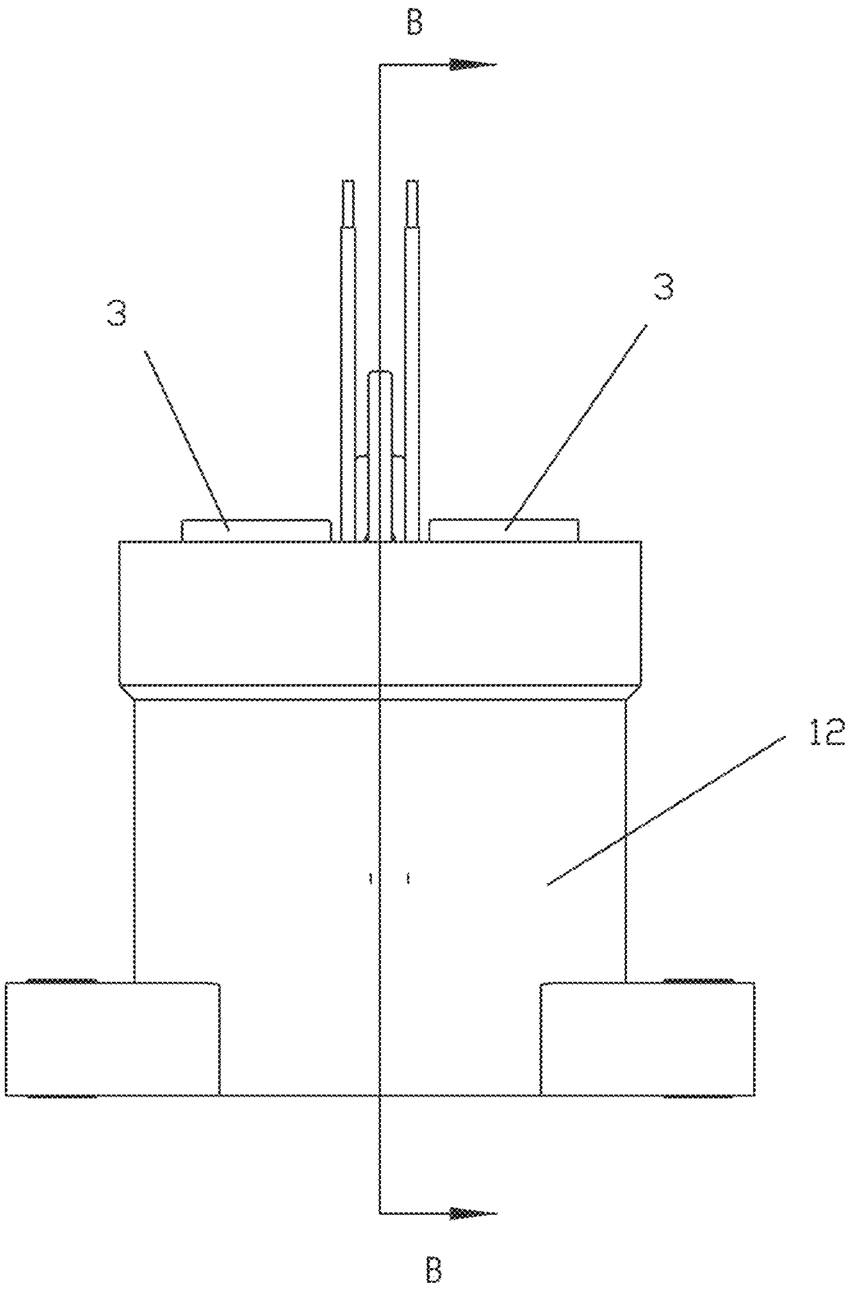
FIG. 25 is a front view showing a high-voltage DC relay of the second implementation of the present disclosure.

Referring to FIG. 18 to FIG. 23, a high-voltage DC relay with auxiliary contacts of the present disclosure differs, which differs from the first embodiment in that the auxiliary movable spring 72 is a U-shaped structure, as shown in FIG. 23, the bottom of the U shape of the U-shaped structure is the connection portion 721, both sides of the U shape of the U-shaped structure are the main body portion 722, the ends of both sides of the U shape of the U-shaped structure are designed as the contact portion 723, and the connection portion 721 is at the top, the contact portion 723 is at the bottom.

Figure 18:
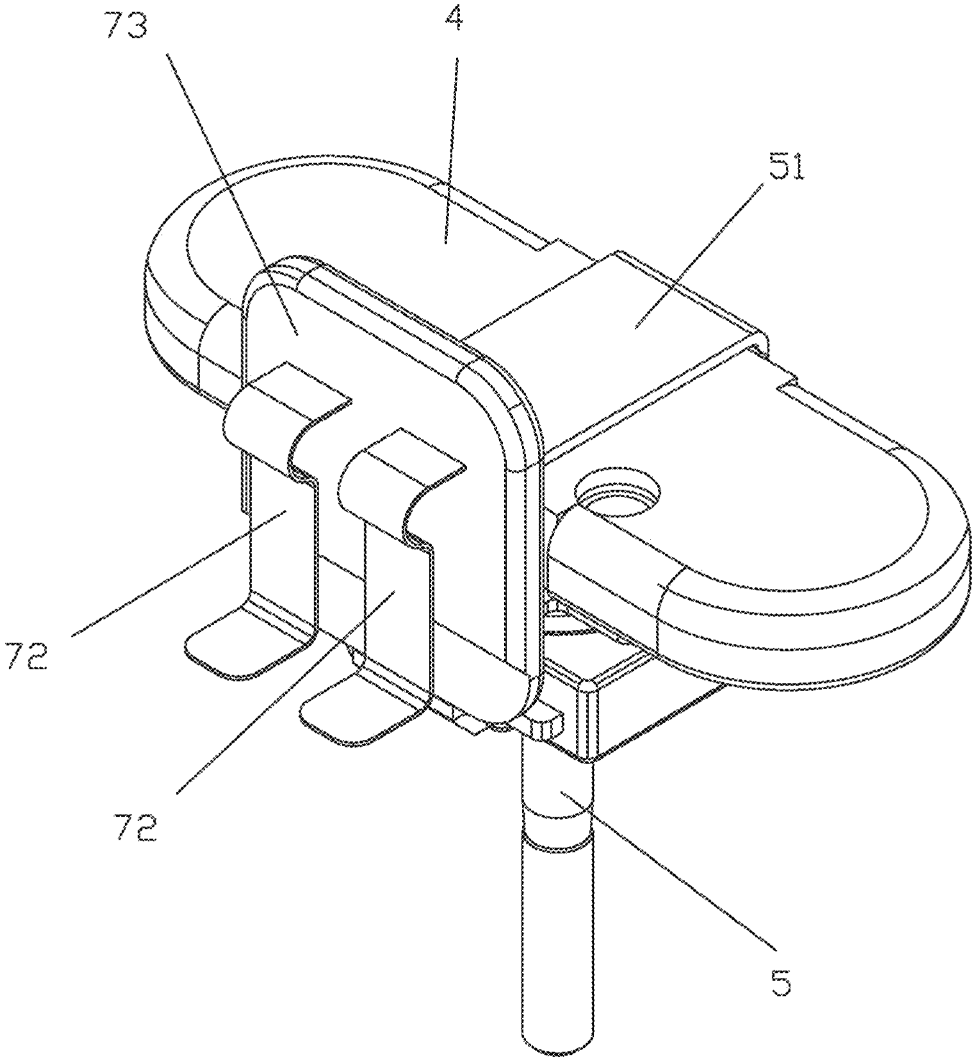
FIG. 18 is a perspective schematic view showing the cooperation of the auxiliary movable spring, the insulating partition plate and the movable assembly of the third embodiment of the first implementation of the present disclosure.
Figure 19:
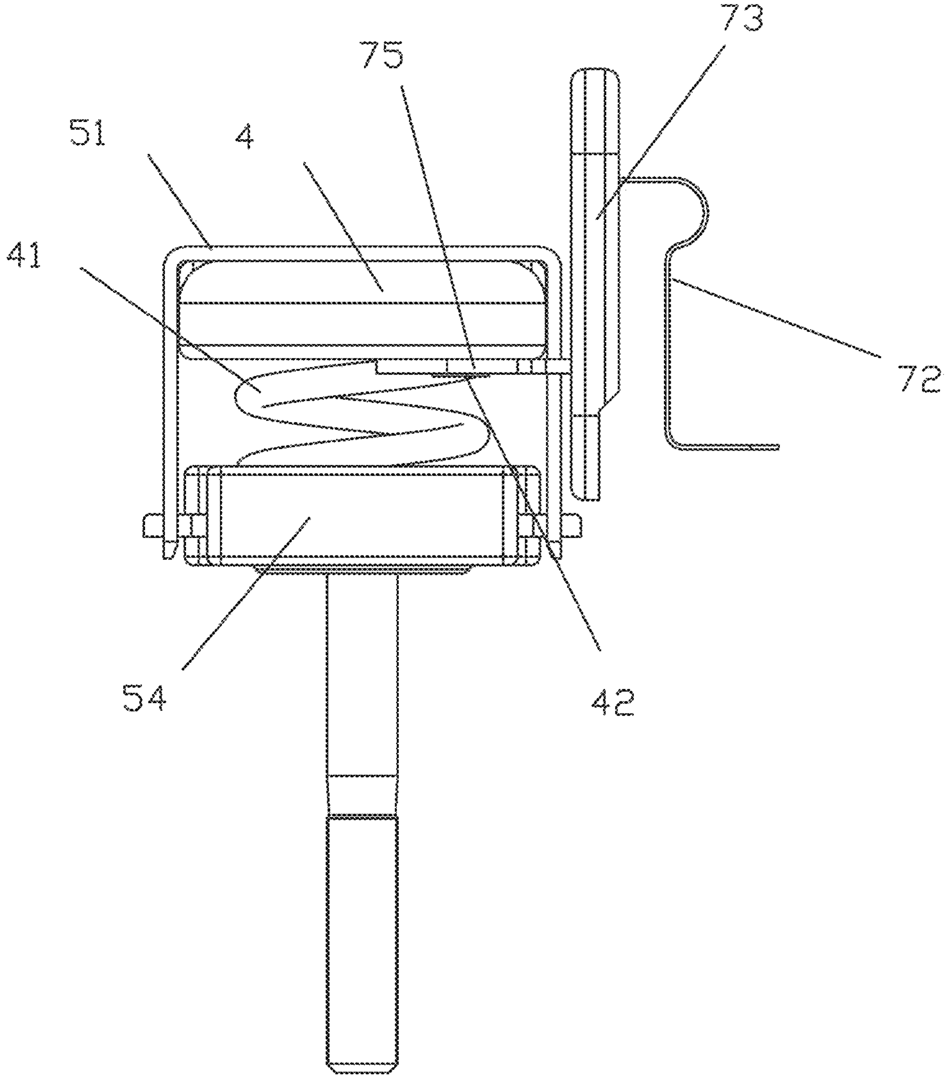
FIG. 19 is a side view showing the cooperation of the auxiliary movable spring, the insulating partition plate and the movable assembly of the third embodiment of the first implementation of the present disclosure.
Figure 20:
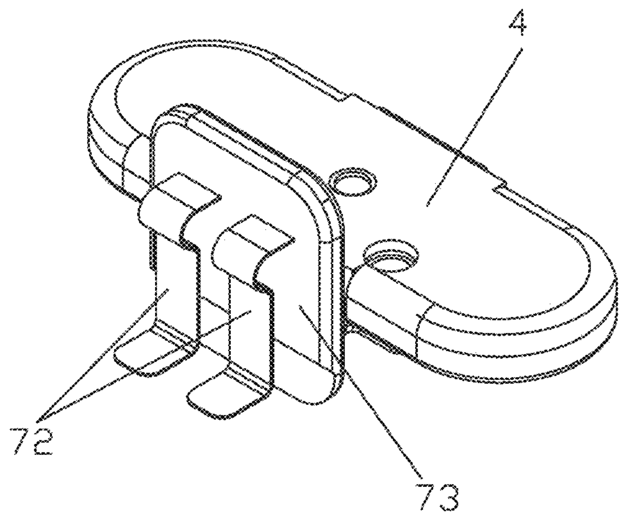
FIG. 20 is a perspective schematic view showing the cooperation of the auxiliary movable spring, the insulating partition plate and the main movable piece of the third embodiment of the first implementation of the present disclosure.

In this embodiment, as shown in FIG. 18, the connection portion 721 of the auxiliary movable spring is bent vertically and embedded in the insulating partition plate 73.

In this embodiment, as shown in FIGS. 21 and 22, the other side of the insulating partition plate 73 is fixed to the main movable piece 4 by a second fixing piece 75, the second fixing piece 75 is arranged horizontally, one end of the second fixing piece 75 is fixed to the insulating partition plate 73, and the other end of the second fixing piece 75 is fixed to the bottom surface of the main movable piece 4 by riveting.

In this embodiment, as shown in FIGS. 21 and 22, the main movable piece 4 is provided with a second convex bud 42 projecting downward, the other end of the second fixing piece 75 is provided with a third through hole 751, the second convex bud 42 of the main movable piece is fitted in the third through hole 751 of the second fixing piece 75 and fixed by riveting.

In this embodiment, one end of the second fixing piece 75 is embedded in the insulating partition by injection molding, so that one end of the second fixing piece 75 is fixed to the insulating partition plate 73.

The high-voltage DC relay with auxiliary contacts of the present disclosure adopts that the other side of the insulating partition plate 73 is riveted to the main movable piece 4 by a second fixing piece 75, so that the auxiliary movable spring 72 can move follow the action of the assembly 50, and has a firm connection and effective insulation of strong current and weak current.

The Second Implementation

Referring to FIGS. 24 to 34, a high-voltage DC relay (that is, a high-voltage direct current relay) of the present disclosure, specifically, may be a high-voltage DC relay with a function of monitoring the working state of the main contacts, including: a cover 11, a base 12, a housing 2 (may be a ceramic cover), two main lead-out terminals 3, a movable assembly 50, a yoke plate 10 and a coil 61; the housing 2 is fitted on the yoke plate 10 and surrounds a cavity 20 for accommodating the main contacts; the two main lead-out terminals 3 are respectively mounted on the top of the housing 2 and the bottom end of each of the two main lead-out terminals 3 set as the main stationary contact are arranged in the cavity 20; the movable assembly 50 includes a pushing rod component 5 and a main movable piece 4 installed in a pushing rod head 54 of the pushing rod component 5, the pushing rod head 54 is fitted in the cavity 20 and makes the main movable contacts provided at both ends of the main movable piece 4 be matched with the main stationary contacts of the two main lead-out terminals 3, in this embodiment, the two end portions at two ends of the main movable piece 4 serve as main movable contacts; the tail portion 55 of the movable assembly 50 passes through the yoke plate 10 and cooperates with the coil 61 under the yoke plate 10 to push the main movable piece 4 to move when the coil 61 works to make the main movable contacts and the main stationary contacts contact with each other; the top of the housing 2 is also installed with an exhaust pipe 7 made of copper material, and the lower portion of the exhaust pipe 7 is located in the cavity 20; the lower portion of the exhaust pipe 7 is also sleeved with a first electrical conductor 81 that can slide up and down along the exhaust pipe 7, the first electrical conductor 81 is also connected to the movable assembly 50 and makes the first electrical conductor 81 in contact with the yoke plate 10 when the coil 61 is not in operation; the yoke plate 10 is further provided with a second electrical conductor 83; the exhaust pipe 7 and the second electrical conductor 83 are respectively connected to signal lines to monitor the working state of the main contacts.

Figure 31:
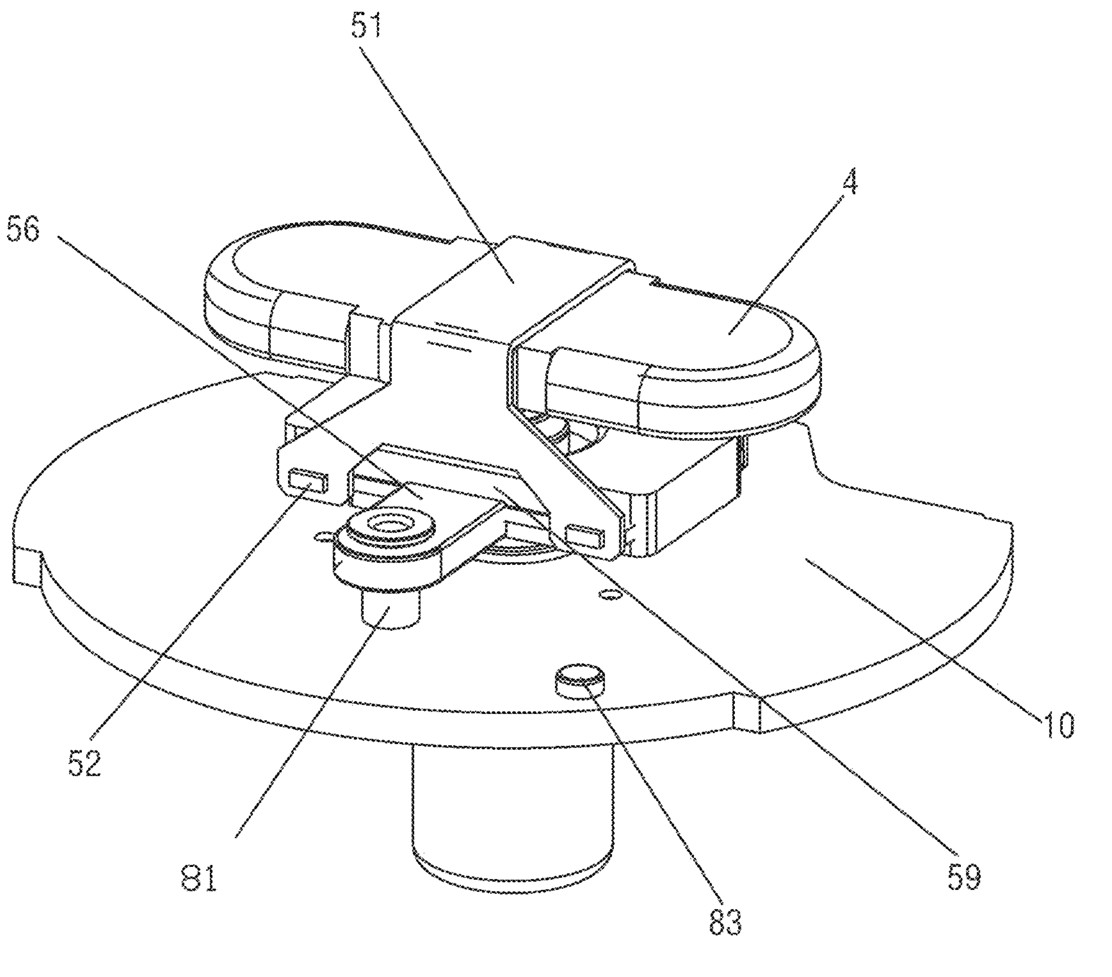
FIG. 31 is a perspective schematic view showing the movable assembly, the yoke plate and the contact ring of the second implementation of the present disclosure.

In this embodiment, as shown in FIG. 31, the first electrical conductor 81 is a contact ring, the movable assembly 50 is provided with an insulating arm 56 extending toward the exhaust pipe 7 in the horizontal direction, the movable assembly 50 drives the contact ring 81 to move through the insulating arm 56.

Figure 34:
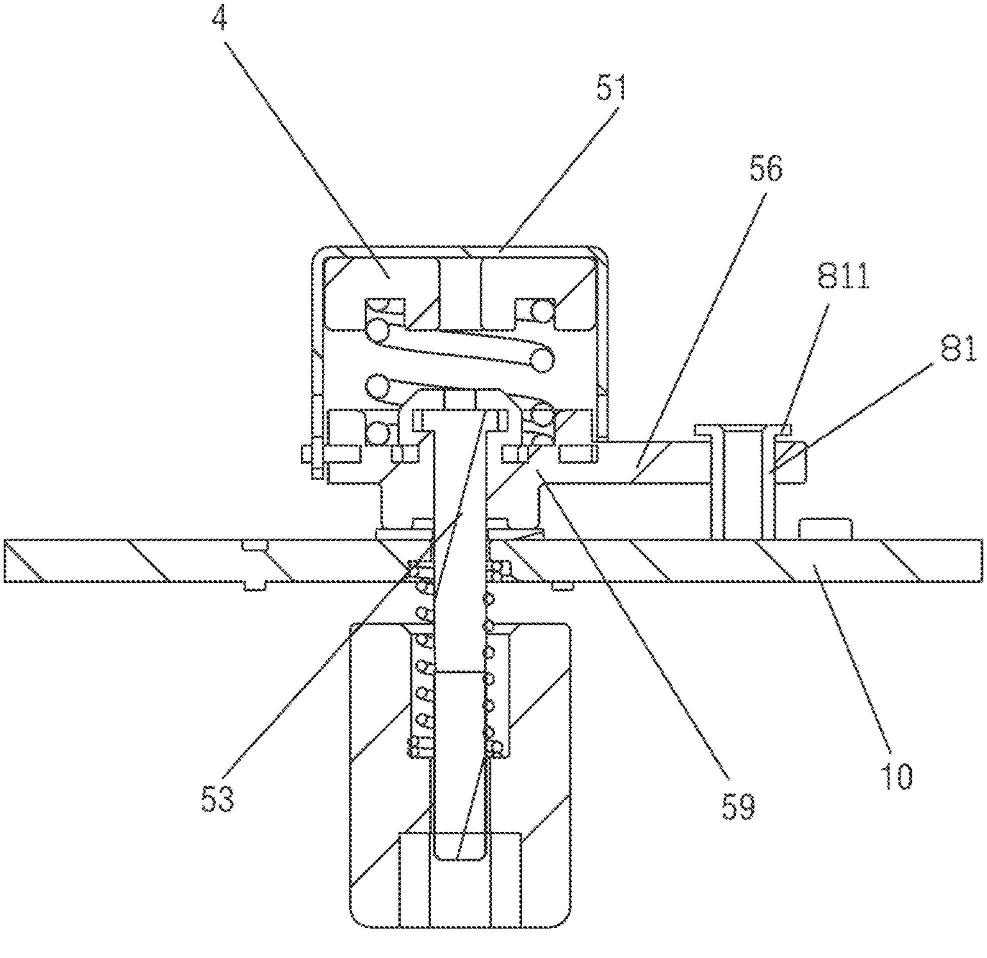
FIG. 34 is a cross-sectional view taken along line C-C in FIG. 32.

In this embodiment, as shown in FIG. 34, the contact ring 81 is provided with a step 811 facing downward, the movable assembly 50 is provided with an insulating arm 56 extending toward the exhaust pipe 7 in the horizontal direction, the insulating arm 56 is fitted at the step 811 of the contact ring 81 with a gap from below to upward, so as to drive the contact ring 81 move upward to out of contact with the yoke plate 10 when the movable assembly 50 moves upward.

Figure 26:
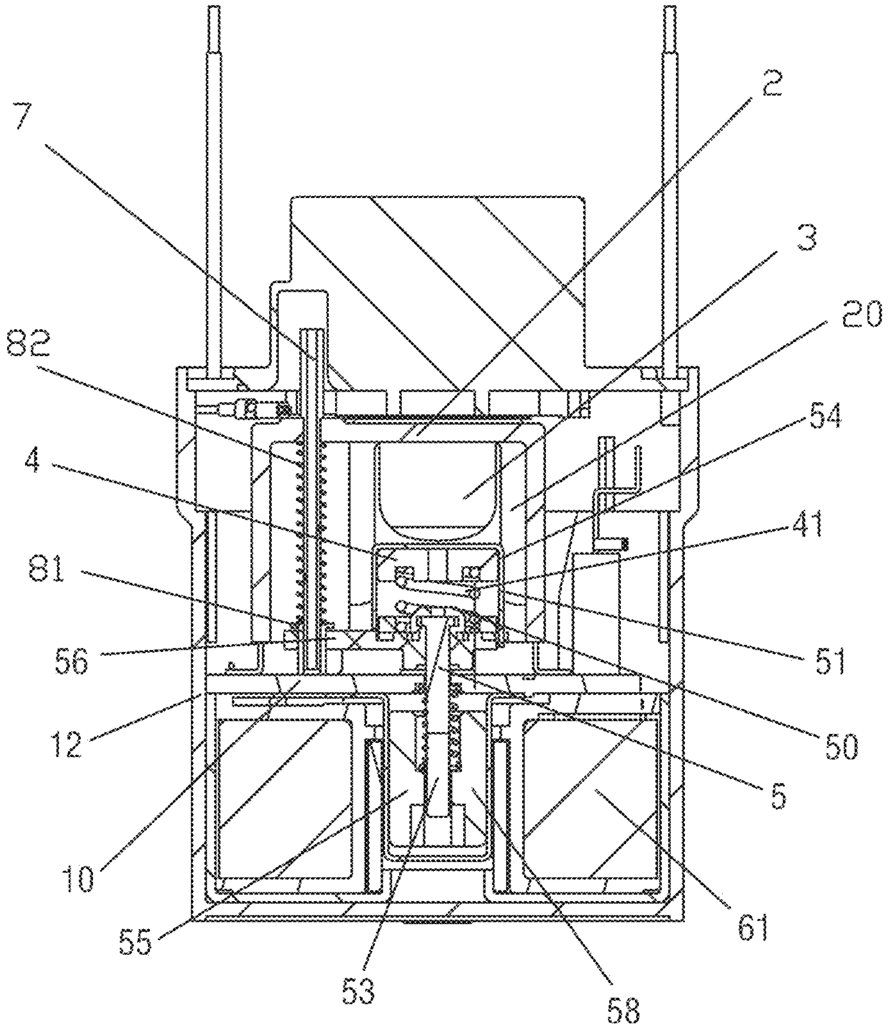
FIG. 26 is a cross-sectional view taken along line B-B in FIG. 26.
Figure 30:
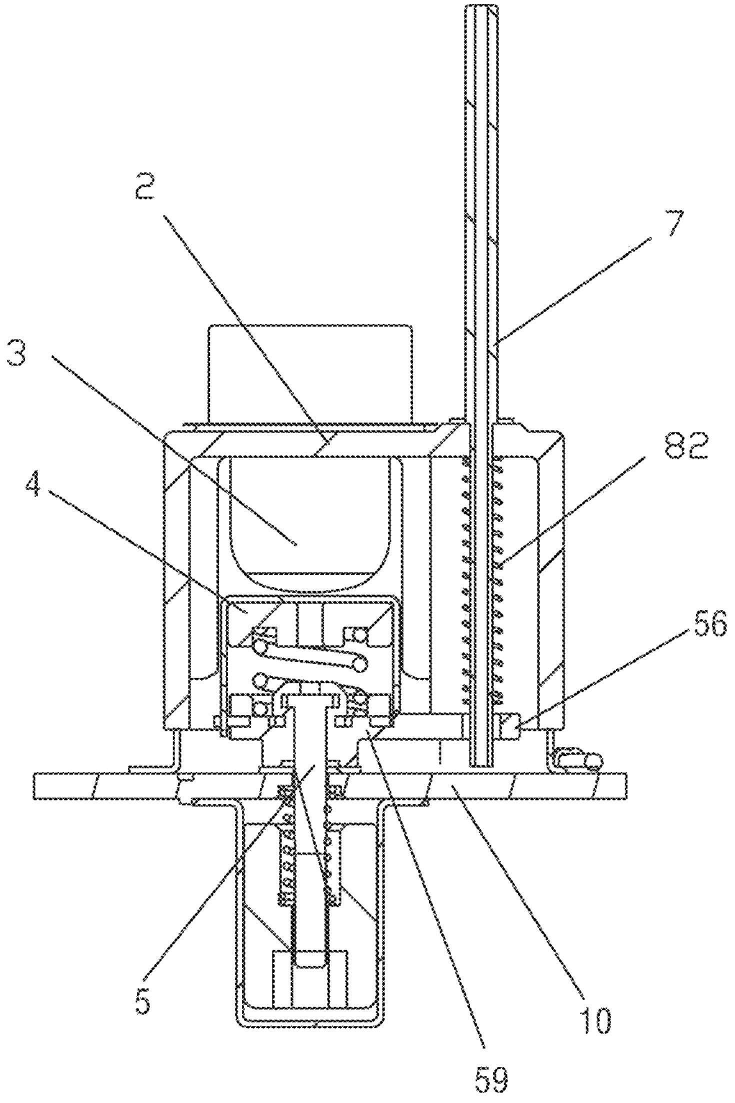
FIG. 30 is a cross-sectional view showing a partial structure of the high-voltage DC relay of the second implementation of the present disclosure.

In this embodiment, as shown in FIGS. 26 and 30, a compression spring 82 is further installed between the top end surface of the contact ring 81 and the top inner wall of the housing 2, when the movable assembly 50 moves downward to move the insulating arm 56 out of contact with the step 811 of the contact ring 81, the compression spring 82 resets and drives the contact ring 81 to move downward to re-contact the yoke plate 10.

Figure 27:
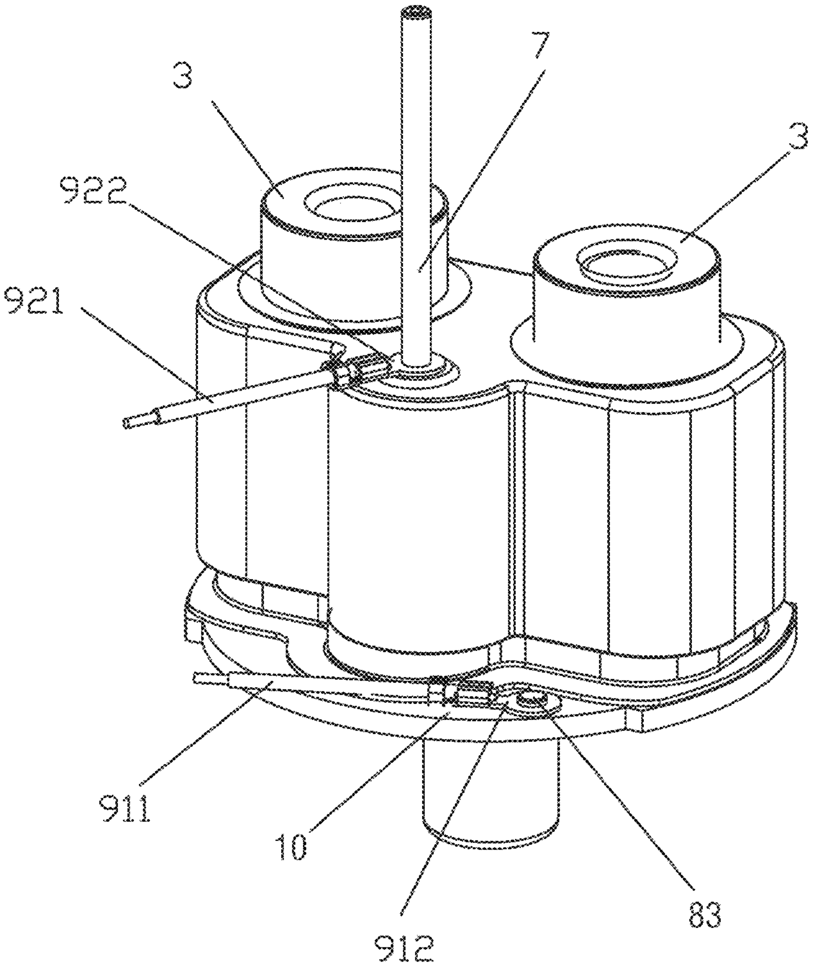
FIG. 27 is a perspective schematic view showing a partial structure of the high-voltage DC relay of the second implementation of the present disclosure.
Figure 28:
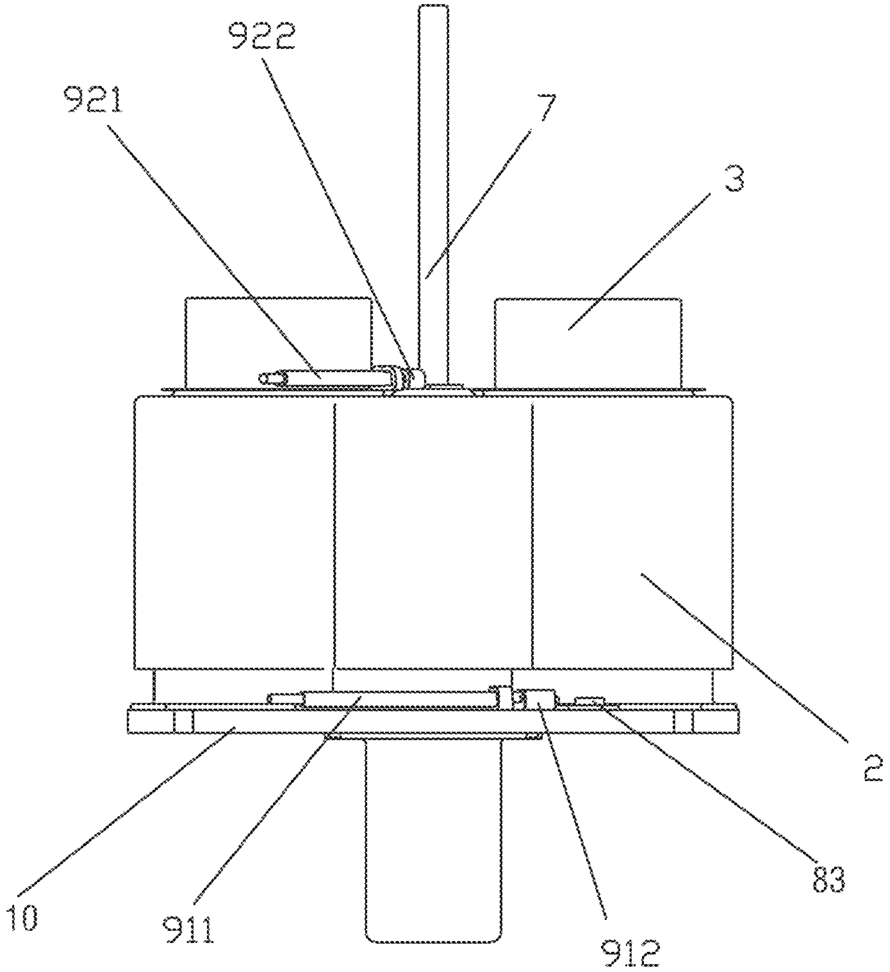
FIG. 28 is a front view showing a partial structure of the high-voltage DC relay of the second implementation of the present disclosure.
Figure 29:
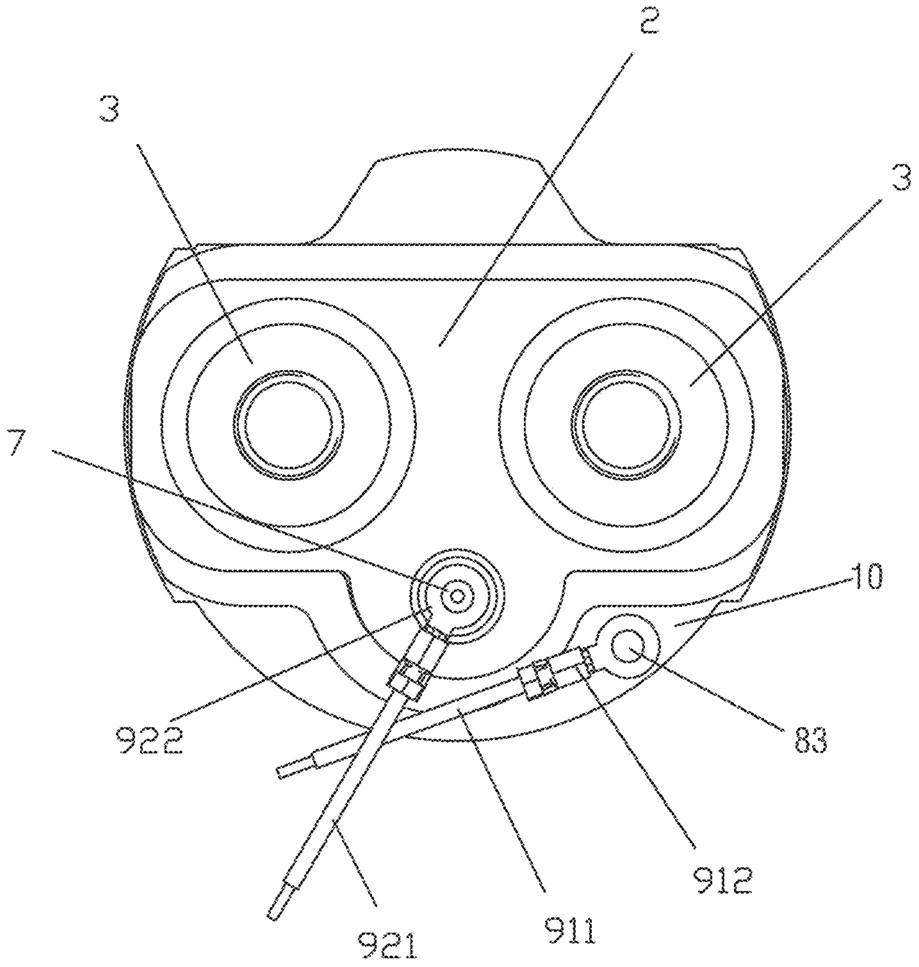
FIG. 29 is a top view showing a partial structure of the high-voltage DC relay of the second implementation of the present disclosure.

In this embodiment, as shown in FIG. 27, the second electrical conductor 83 is a convex bud integrally formed on the yoke plate 10.

In this embodiment, as shown in FIG. 27, the convex bud-shaped second electrical conductor 83 of the yoke plate 10 is outside the coverage area of the housing 2, a first signal line 911 is sleeved on the second electrical conductor 83 (that is, sleeved on the convex bud) of the yoke plate 10 through a first wiring terminal 912, a second signal line 921 is in sleeve contact with the exhaust pipe 7 on the top surface of the housing 2 through a second wiring terminal 922.

In this embodiment, as shown in FIG. 27, the projection of the exhaust pipe 7 on the yoke plate 10 and the projection of the second electrical conductor 83 (that is, the convex bud) of the yoke plate 10 on the yoke plate 10 are on the same side with respect to the connecting line between the two main lead-out terminals 3.

Figure 32:
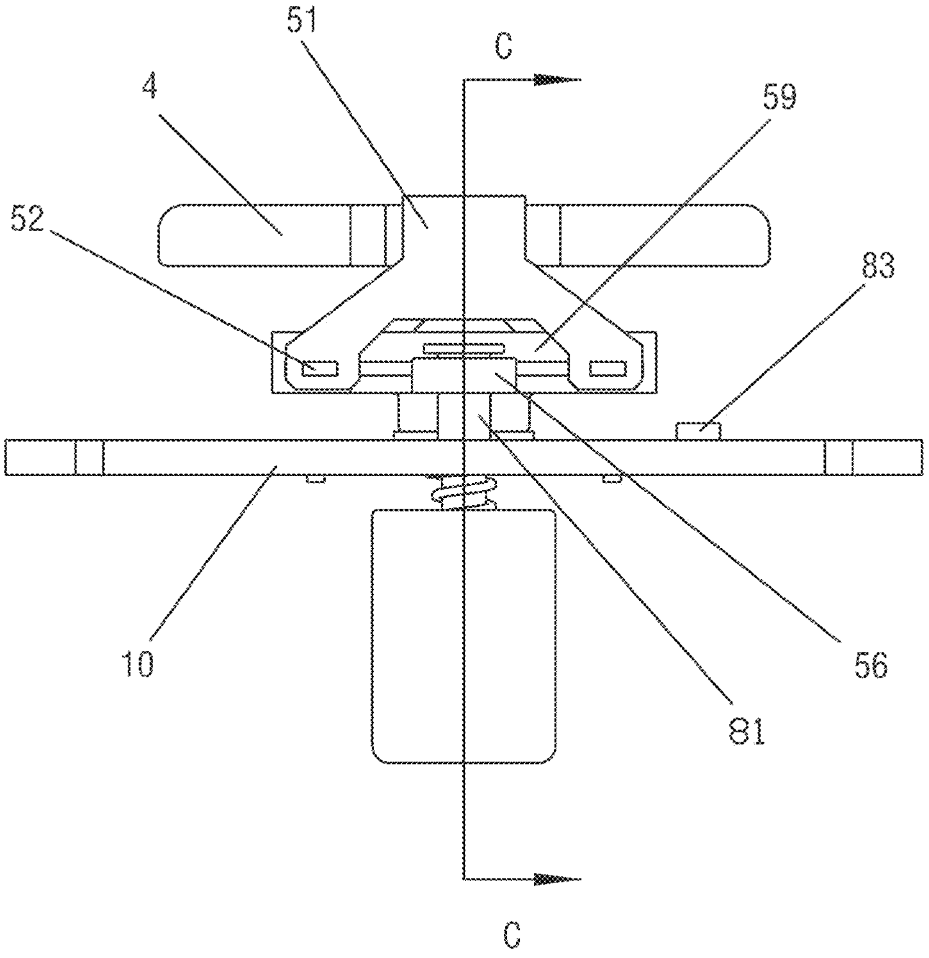
FIG. 32 is a front view showing the movable assembly, the yoke plate and the contact ring of the second implementation of the present disclosure.
Figure 33:
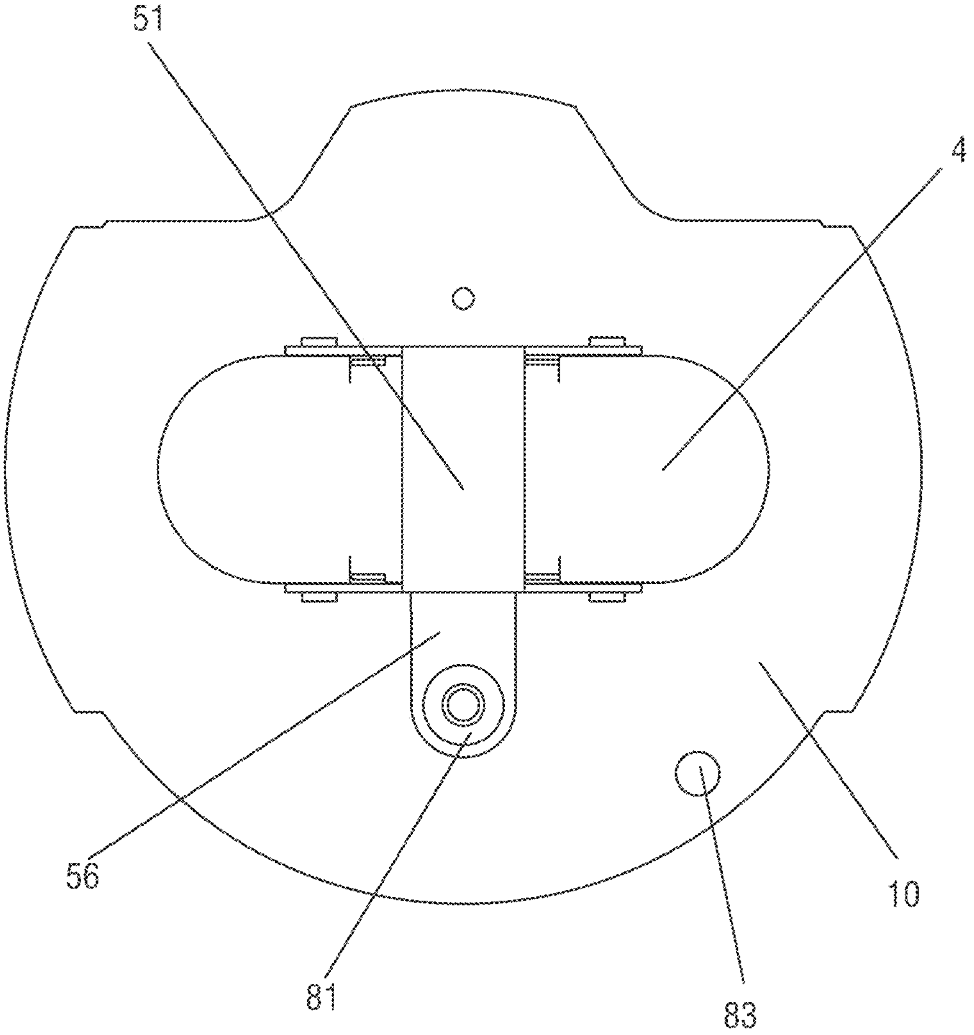
FIG. 33 is a top view showing the movable assembly, the yoke plate and the contact ring of the second implementation of the present disclosure.

In this embodiment, as shown in FIGS. 31 and 32, the pushing rod component 5 includes an U-shaped bracket 51, a first fixing piece 52, and a pushing rod 53, one end of the pushing rod 53 is connected to the first fixing piece 52 through a plastic body 59 by injection molding, the other end of the pushing rod 53 is connected to the movable iron core 58 and serves as the tail 55 of the pushing rod component 5 to cooperate with the coil 61, the two ends of the U-shaped bracket 51 are connected downward to the first fixing piece 52 protruding from both sides of the plastic body 59, combined with FIGS. 26 and 34, the main movable piece 4 is installed in the U-shaped bracket 51 through the main spring 41 to form the pushing rod head 54, one end of the main spring 41 presses the main movable piece 4 toward the inside of the top of the U-shaped bracket 51, and the other end of the main spring 41 abuts against the plastic body 59; the insulating arm 56 is formed by the plastic body 59 extending toward the exhaust pipe 7.

A high-voltage DC relay with a function of monitoring the working state of the main contacts of the present disclosure adopts that a first electrical conductor 81 that can slide up and down along an exhaust pipe 7 is sleeved on the lower portion of the exhaust pipe 7, and the first electrical conductor 81 is also connected to the movable assembly 50, so that when the coil 61 is not working, the first electrical conductor 81 is in contact with the yoke plate 10; the yoke plate 10 is also provided with a second electrical conductor 83; the exhaust pipe 7 and the second electrical conductor 83 are respectively connected to signal lines. This structure of the present disclosure uses the exhaust pipe 7, the first electrical conductor 81, the yoke plate 10, and the second electrical conductor 83 to form a monitoring circuit for monitoring the working state of the main contacts, the first electrical conductor 81 and the yoke plate 10 are equivalent to the normally closed auxiliary contact for detecting the main contacts, and the exhaust pipe 7 is equivalent to the upper auxiliary lead-out terminal, the second electrical conductor 83 is equivalent to the lower auxiliary lead-out terminal. When the coil of the relay is not working, the first electrical conductor 81 is in contact with the yoke plate 10, the circuit connected to the signal line is closed, when the coil of the relay is working, the first electrical conductor 81 is not in contact with the yoke plate 10, and the circuit connected to the signal line is opened, thereby realizing monitoring the working state of the main contacts. In the present disclosure, due to the full use of the exhaust pipe 7 and the yoke plate 10, not only the auxiliary contact function in the high-voltage DC relay can be achieved to monitor the operation state of the main contacts, but also the volume of the high-voltage DC relay product will not be increased excessively, so that the product can be used in applications with small space.

A high-voltage DC relay with a function of monitoring the working state of the main contacts of the present disclosure adopts that the first electrical conductor 81 is designed as a contact ring, the convex bud integrally formed on the yoke plate 10 is used as the second electrical conductor 51, so that the relay of the present disclosure has the characteristics of simple structure and low cost, and because a compression spring 82 is also installed between the top surface of the contact ring 81 and the top inner wall of the housing 2, on the one hand, the compression spring 82 is used to restore the contact ring 81, and on the other hand, the stability of the electrical connection between the contact ring 81 and the exhaust pipe 7 can be improved.

The above described is only a preferred embodiment of the present disclosure, and does not limit the present disclosure in any form. Although the present disclosure has been disclosed as above with preferred embodiments, it is not intended to limit the present disclosure. Any person skilled in the art, without departing from the scope of the technical solutions of the present disclosure, can use the technical content disclosed above to make many possible changes and modifications to the technical solutions of the present disclosure, or to modify into equivalent embodiments. Therefore, any simple amendments, equivalent changes, and modifications made to the above embodiments based on the technical essence of the present disclosure without departing from the technical solutions of the present disclosure shall fall within the protection scope of the technical solutions of the present disclosure.

What is claimed is:

1. A high-voltage DC relay, comprising a housing, two main lead-out terminals, a main movable piece and a pushing rod component; the two main lead-out terminals are respectively mounted on a top of the housing and bottom ends of the two main lead-out terminals are respectively located inside the housing, the main movable piece is accommodated in the housing and fitted under the two main lead-out terminals, when the main movable piece is pushed by the pushing rod component and then contacts the two main lead-out terminals, current flows in from one of the two main lead-out terminals, and flows out from another of the main lead-out terminals after passing through the main movable piece, so that the main movable piece is bridged with the two main lead-out terminals; the main movable piece and the pushing rod component are assembled together to form a movable assembly; wherein the relay further comprising two auxiliary lead-out terminals, an auxiliary movable spring and an insulating partition plate; the insulating partition plate is disposed in a first vertical plane on a side of the main movable piece, the auxiliary movable spring is disposed on a side of the insulating partition plate opposite the main movable piece, and a main body portion of the auxiliary movable spring is disposed in a second vertical plane, the insulating partition plate is configured to completely isolate the main movable piece and the auxiliary movable spring; the auxiliary movable spring is insulated from the movable assembly and fixed to the movable assembly through the insulating partition plate, so as to follow a movement of the movable assembly to achieve bridging with the two auxiliary lead-out terminals; the other side of the insulating partition plate is connected with the movable assembly.

2. The high-voltage DC relay according to claim 1, wherein the auxiliary movable spring comprises a connection portion for fixing with the insulating partition plate, a contact portion for matching with the bottom ends of the two auxiliary lead-out terminals, and a main body portion between the connection portion and the contact portion, the contact portion is disposed along a horizontal direction, the main body portion and the insulating partition plate are both disposed along the vertical direction.

3. The high-voltage DC relay according to claim 2, wherein the auxiliary movable spring is an U-shaped structure, a bottom of the U shape of the U-shaped structure is arranged as the contact portion, both sides of the U shape of the U-shaped structure are arranged as the main body portion, ends of both sides of the U shape of the U-shaped structure are arranged as the connection portion, and the connection portion is at the top, the contact portion is at the bottom.

4. The high-voltage DC relay according to claim 2, wherein the auxiliary movable spring is an U-shaped structure, a bottom of the U shape of the U-shaped structure is arranged as the connection portion, both sides of the U shape of the U-shaped structure are arranged as the main body portion, ends of both sides of the U shape of the U-shaped structure are arranged as the contact portion, and the connection portion is at the top, the contact portion is at the bottom.

5. The high-voltage DC relay according to claim 2, wherein the auxiliary movable spring is a mouth-shaped structure, the auxiliary movable spring is a mouth-shaped structure, an upper side of the mouth shape of the mouth-shaped structure is arranged as the connection portion, two sides of the mouth shape of the mouth-shaped structure are arranged as the main body portion, and a bottom side of the mouth shape of the mouth-shaped structure is arranged as the contact portion.

6. The high-voltage DC relay according to claim 3, wherein the main body portion of the auxiliary movable spring is further provided with a bending portion protruding in a direction away from the insulating partition plate.

7. The high-voltage DC relay according to claim 3, wherein the connection portion of the auxiliary movable spring is embedded in the insulating partition plate by injection molding, so that the connection portion of the auxiliary movable spring is fixed to the insulating partition plate.

8. The high-voltage DC relay according to claim 7, wherein the connection portion of the auxiliary movable spring is bent horizontally or vertically, and embedded in the insulating partition plate.

9. The high-voltage DC relay according to claim 7, wherein the connection portion of the auxiliary movable spring is further provided with a first through hole to allow a plastic body to enter the first through hole during injection.

10. The high-voltage DC relay according to claim 3, wherein the connection portion of the auxiliary movable spring is fixed on one side of the insulating partition plate by interference fit or hot riveting, at least one first convex bud is provided on one side of the insulating partition plate, the connection portion of the auxiliary movable spring is configured to extend in the vertical direction, and at least one second through hole is provided in the connection portion, the first convex bud of the insulating partition plate are inserted into the second through hole of the auxiliary movable spring and fixed by an interference method or a hot riveting method.

11. The high-voltage DC relay according to claim 1, wherein the pushing rod component comprises a U-shaped bracket, a first fixing piece and a pushing rod, one end of the pushing rod and the first fixing piece are combined into a pushing rod head by injection molding, and the other end of the pushing rod is configured to serves as a tail and is connected to a magnetic circuit portion, two ends of the U-shaped bracket are connected downward to the first fixing piece protruding from the pushing rod head to both sides thereof, and the main movable piece is installed in the U-shaped bracket through the main spring, one end of the main spring is configured to press the main movable piece against the inside of the top of the U-shaped bracket, and the other end of the main spring is configured to press against the pushing rod head.

12. The high-voltage DC relay according to claim 11, wherein the other side of the insulating partition plate is fixed to the main movable piece by a second fixing piece, the second fixing piece is arranged horizontally, one end of the second fixing piece is fixed to the insulating partition plate, and the other end of the second fixing piece is fixed to a bottom surface of the main movable piece by riveting.

13. The high-voltage DC relay according to claim 12, wherein the main movable piece is provided with a second convex bud projecting downward, the other end of the second fixing piece is provided with a third through hole, the second convex bud of the main movable piece is fitted in the third through hole of the second fixing piece and fixed by riveting.

14. The high-voltage DC relay according to claim 12, wherein the one end of the second fixing piece is embedded in the insulating partition by injection molding, so that the one end of the second fixing piece is fixed to the insulating partition plate.

15. The high-voltage DC relay according to claim 11, wherein the other side of the insulating partition plate is integrally formed with a plastic body portion of the pushing rod head by hot riveting method.

16. The high-voltage DC relay according to claim 11, wherein the other side of the insulating partition plate is fixed to a top of the U-shaped bracket through a third fixing piece, the third fixing piece is arranged horizontally, one end of the third fixing piece is fixed to the insulating partition plate, and the other end of the third fixing piece is fixed to a top surface of the top of the U-shaped bracket by riveting.

17. The high-voltage DC relay according to claim 16, wherein the other end of the third fixing piece is provided with a third convex bud projecting downward, the top of the U-shaped bracket is provided with a fourth through hole, and the third convex bud of the third fixing piece is fitted in the fourth through hole of the U-shaped bracket and fixed by riveting.

18. The high-voltage DC relay according to claim 17, wherein the top of the U-shaped bracket is further provided with a lug boss protruding upward, the fourth through hole of the U-shaped bracket is provided at the lug boss, so that a riveting portion of the third convex bud of the third fixing piece is configured to give way to the main movable piece.

19. The high-voltage DC relay according to claim 16, wherein one end of the third fixing piece is embedded in the insulating partition plate by injection molding, so that one end of the third fixing piece is fixed to the insulating partition plate.

* * * * *